(12) United States Patent
Rico Alvarino et al.

(10) Patent No.: US 10,924,226 B2
(45) Date of Patent: Feb. 16, 2021

(54) SYSTEM, APPARATUS AND METHOD FOR ESTABLISHING CONNECTIONS FOR NARROW-BAND IOT DEVICES

(71) Applicant: QUALCOMM Incorporated, San Diego, CA (US)

(72) Inventors: Alberto Rico Alvarino, San Diego, CA (US); Tae Min Kim, San Diego, CA (US); Le Liu, Fremont, CA (US); Raghavendra Shyam Ananda, Hyderabad (IN); Wanshi Chen, San Diego, CA (US); Ayan Sengupta, San Diego, CA (US); Srikanth Menon, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/368,670

(22) Filed: Mar. 28, 2019

(65) Prior Publication Data

US 2019/0305899 A1 Oct. 3, 2019

(30) Foreign Application Priority Data

Apr. 3, 2018 (IN) .............................. 201841012581

(51) Int. Cl.
*H04W 24/02* (2009.01)
*H04L 1/20* (2006.01)
*H04W 4/80* (2018.01)
*H04L 1/00* (2006.01)
*H04W 24/08* (2009.01)
*H04W 74/08* (2009.01)
(Continued)

(52) U.S. Cl.
CPC ............ *H04L 1/203* (2013.01); *H04L 1/0047* (2013.01); *H04W 4/80* (2018.02); *H04W 24/08* (2013.01); *H04W 24/10* (2013.01); *H04W 72/042* (2013.01); *H04W 74/0833* (2013.01)

(58) Field of Classification Search
None
See application file for complete search history.

(56) References Cited

U.S. PATENT DOCUMENTS

2016/0218788 A1* 7/2016 Yum ..................... H04B 7/0626
2017/0346607 A1* 11/2017 Chen ..................... H04L 1/1896
(Continued)

FOREIGN PATENT DOCUMENTS

WO 2018031300 A1 2/2018

OTHER PUBLICATIONS

International Search Report and Written Opinion—PCT/US2019/024796—ISA/EPO—dated Jul. 3, 2019.

*Primary Examiner* — Ayanah S George
(74) *Attorney, Agent, or Firm* — Loza & Loza, LLP

(57) ABSTRACT

In some aspects, a method for a user equipment (UE) is provided. In some examples, the UE determines a signal quality for communicating with a node. The UE determines a coverage level based on the signal quality, wherein the coverage level indicates resources to be used for communicating with the node. The UE determines a maximum repetition level and a repetition value, based on the coverage level, for communicating with the node. The UE generates a multibit repetition range identifier that indicates the repetition value based on the maximum repetition level. The UE transmits the multibit repetition range identifier.

30 Claims, 17 Drawing Sheets

(51) Int. Cl.
*H04W 24/10* (2009.01)
*H04W 72/04* (2009.01)

(56) References Cited

U.S. PATENT DOCUMENTS

2017/0374574 A1* 12/2017 Lee ................... H04W 24/10
2018/0049053 A1*  2/2018 Kaikkonen ........... H04W 24/08
2018/0242179 A1*  8/2018 Rathonyi ............ H04W 52/346
2019/0174510 A1*  6/2019 Shin ................... H04L 5/0053

* cited by examiner

| $R_{max}$ | R | DCI Subframe repetition number | NCCE indices of monitored NPDCCH candidates | |
|---|---|---|---|---|
| | | | L'=1 | L'=2 |
| 1 | 1 | 00 | — | {0,1} |
| 2 | 1 | 00 | — | {0,1} |
| | 2 | 01 | — | {0,1} |
| 4 | 1 | 00 | — | {0,1} |
| | 2 | 01 | — | {0,1} |
| | 4 | 10 | — | {0,1} |
| >=8 | $R_{max}/8$ | 00 | — | {0,1} |
| | $R_{max}/4$ | 01 | — | {0,1} |
| | $R_{max}/2$ | 10 | — | {0,1} |
| | $R_{max}$ | 11 | — | {0,1} |

*FIG. 5*

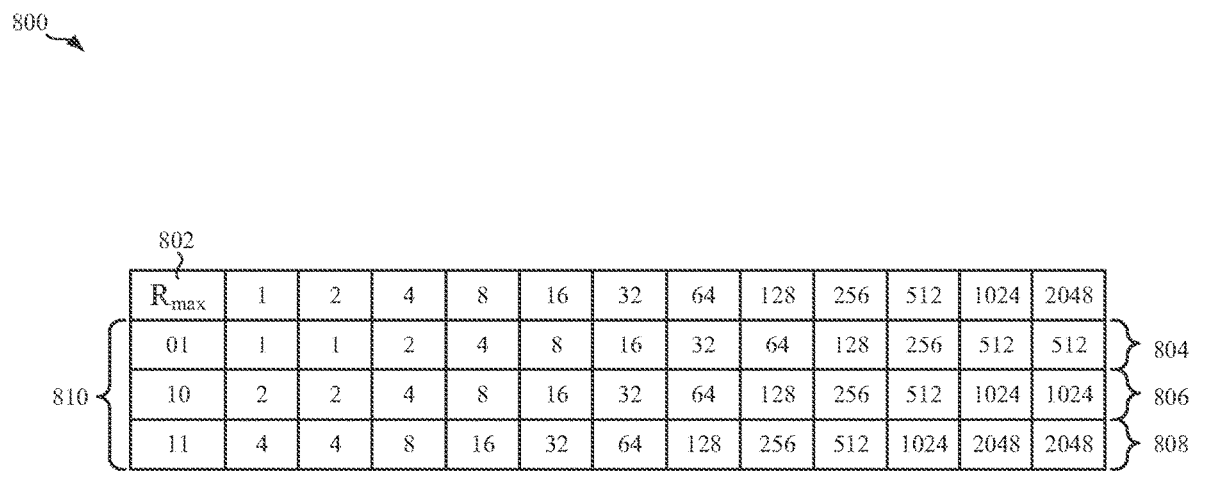

| $R_{max}$ | 1 | 2 | 4 | 8 | 16 | 32 | 64 | 128 | 256 | 512 | 1024 | 2048 |
|---|---|---|---|---|---|---|---|---|---|---|---|---|
| 01 | 1 | 1 | 2 | 4 | 8 | 16 | 32 | 64 | 128 | 256 | 512 | 512 |
| 10 | 2 | 2 | 4 | 8 | 16 | 32 | 64 | 128 | 256 | 512 | 1024 | 1024 |
| 11 | 4 | 4 | 8 | 16 | 32 | 64 | 128 | 256 | 512 | 1024 | 2048 | 2048 |

*FIG. 8*

SYSTEM, APPARATUS AND METHOD FOR ESTABLISHING CONNECTIONS FOR NARROW-BAND IOT DEVICES

CLAIM OF PRIORITY

The present application for patent claims priority to Indian Patent Application No. 201841012581 entitled "System, Apparatus and Method for Establishing Connections for Narrow-Band IOT Devices" filed Apr. 3, 2018, the entire disclosure of which is hereby expressly incorporated by reference.

BACKGROUND

Field

Various features relate to communication techniques for establishing a connection for a device, such as a user equipment (UE) device, to a node. More specifically, various features relate to establishing wireless connection for a UE device with a node, particularly under noisy environments.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

Narrowband Internet of things (NB-IoT) is a Low Power Wide Area Network (LPWAN) radio technology standard developed to enable a wide range of devices and services to be connected using cellular telecommunications bands. NB-IoT is a narrowband radio technology designed for the Internet of Things (IoT) and is one of a range of Mobile IoT (MIoT) technologies standardized by the 3rd Generation Partnership Project (3GPP). Other 3GPP IoT technologies include eMTC (enhanced Machine-Type Communication) and extended coverage (EC) Global System for Mobile communications (GSM) IoT (EC-GSM-IoT).

NB-IoT focuses specifically on indoor low cost, long battery life, and enabling a large number of connected devices. The NB-IoT technology is deployed "in-band" in spectrum allocated to Long Term Evolution (LTE), using resource blocks within a normal LTE carrier (or in the unused resource blocks within a LTE carrier's guard-band) or "standalone" for deployments in a dedicated spectrum. It is also suitable for the re-farming of the GSM spectrum.

When NB-IoT devices are connecting to a node (e.g., base station) and attempting to establish a downlink connection, interference and/or noise in the channel may hinder or prohibit the establishment of a connection. Furthermore, present technologies limit how a device may report downlink channel quality. Technologies and techniques are needed to allow wireless devices to effectively and efficiently communicate downlink channel quality and to establish improved connections as a result.

SUMMARY

Various features relate to various technologies and techniques for establishing communications between a device and a node, particularly in a NB-IoT environment.

In some illustrative embodiments, a method for communication is disclosed. The method may be performed by a device, such as a user equipment (UE). The method includes determining, in a device, a signal quality for communicating with a node; determining, in the device, a coverage level based on the signal quality, wherein the coverage level indicates resources to be used for communicating with the node; determining, in the device, a maximum repetition level and a repetition value, based on the coverage level, for communicating with the node; generating, in the device, a multibit repetition range identifier that indicates the repetition value based on the maximum repetition level; and transmitting the multibit repetition range identifier.

In some illustrative embodiments, an apparatus for communication is disclosed. The apparatus may be a UE. The apparatus may include one or more antennas and a processing apparatus, operatively coupled to the one or more antennas. The processing apparatus may be configured to: determine a signal quality for communicating with a node; determine a coverage level based on the signal quality, wherein the coverage level indicates resources to be used for communicating with the node; determine a maximum repetition level and a repetition value, based on the coverage level, for communicating with the node; generate a multibit repetition range identifier that indicates the repetition value based on the maximum repetition level; and transmit the multibit repetition range identifier.

In some illustrative embodiments, an apparatus is disclosed. The apparatus may include means for determining a signal quality for communicating with a node; means for determining a coverage level based on the signal quality, wherein the coverage level indicates resources to be used for communicating with the node; means for determining a maximum repetition level and a repetition value, based on the coverage level, for communicating with the node; means for generating a multibit repetition range identifier that indicates the repetition value based on the maximum repetition level; and means for transmitting the multibit repetition range identifier.

In some illustrative embodiments a non-transitory computer-readable medium storing computer-executable code is disclosed. The computer-executable code may include code for causing a computer to: determine a signal quality for communicating with a node; determine a coverage level based on the signal quality, wherein the coverage level indicates resources to be used for communicating with the node; determine a maximum repetition level and a repetition value, based on the coverage level, for communicating with the node; generate a multibit repetition range identifier that indicates the repetition value based on the maximum repetition level; and transmit the multibit repetition range identifier.
on value.

In some illustrative embodiments, a method for communication is disclosed. The method includes determining, in a device, a signal quality for communicating with a node; determining, in the device, a coverage level for indicating resources to be used for communicating with the node; determining, in the device, a maximum repetition level, based on the coverage level, for communicating with the node; and generating in the device and transmitting a multibit repetition range identifier based on the maximum repetition level, wherein the multibit repetition range identifier is configured to allow the device to receive a repetition value for repeating one or more signals received during a random access procedure. In some illustrative embodiments, the maximum repetition level is based on a value needed to decode a Narrowband Physical Downlink Control Channel (NPDCCH) signal with a predetermined minimum block error rate (BLER), and the predetermined BLER is less than, or equal to, 1%.

In some illustrative embodiments, the multibit repetition range identifier comprises a plurality of bits indicating a desired repetition (R') value for decoding a Narrowband Physical Downlink Control Channel (NPDCCH) signal.

In some illustrative embodiments, generating the multibit repetition range identifier comprises processing a scaling value, received from the node, with the maximum repetition level.

In some illustrative embodiments, the method further includes monitoring one or more lower-level maximum repetition levels after determining the maximum repetition level; determining if the one or more lower-level maximum repetition levels are suitable for use for the determined coverage level; and using the lowest of the lower-level maximum repetition levels as a new maximum repetition level.

In some illustrative embodiments, the method further comprises generating a new multibit repetition range identifier based on the new maximum repetition level, wherein the new multibit repetition range identifier is configured to allow the device to receive a new repetition value for repeating one or more signals received during the random access procedure.

In some illustrative embodiments, determining a maximum repetition level comprises generating a virtual Narrowband Physical Downlink Control Channel (NPDCCH) signal that is based on one or predetermined parameters. In some illustrative embodiments, the predetermined parameters comprise at least one of: a search space in which a random access response is received, a NPDCCH in which DCI scheduling for a random access request is received, a physical downlink shared channel (PDSCH) carrying a Message 2 message, a subframe for a first narrowband physical uplink shared channel (NPUSCH) subframe carrying a Message 3 signal, a start of a random access request (RAR) window, and after a the transmission of a Message 3 signal.

In some illustrative embodiments, an apparatus for communication, is disclosed, comprising: one or more antennas, a processing apparatus, operatively coupled to the one or more antennas, the processor being configured to: determine a signal quality for communicating with a node; determine a coverage level for indicating resources to be used for communicating with the node; determine a maximum repetition level, based on the coverage level, for communicating with the node; and generate and transmit a multibit repetition range identifier based on the maximum repetition level, wherein the multibit repetition range identifier is configured to allow the device to receive a repetition value for repeating one or more signals received during a random access procedure. In some illustrative embodiments, the maximum repetition level is based on a value needed to decode a Narrowband Physical Downlink Control Channel (NPDCCH) signal with a predetermined minimum block error rate (BLER), wherein the predetermined BLER is less than, or equal to, 1%

In some illustrative embodiments, a processor-based method for communication is disclosed, comprising: determining, in a device, a signal quality for communicating with a node; determining, in the device, a repetition value needed to decode a Narrowband Physical Downlink Control Channel (NPDCCH) signal with a predetermined minimum block error rate (BLER); transmitting the repetition value to the node; and decoding the NPDCCH signal using the repetition value to establish communications with the node.

In some illustrative embodiments, an apparatus for communication is disclosed, comprising: one or more antennae; and a processing apparatus, operatively coupled to the one or more antennae, wherein the processing apparatus is configured to: determine a signal quality for communicating with a node; determine a repetition value needed to decode a Narrowband Physical Downlink Control Channel (NPDCCH) signal with a predetermined minimum block error rate (BLER); transmit, via the one or more antennae, the repetition value to the node; and decode the NPDCCH signal using the repetition value to establish communications with the node.

In some illustrative embodiments, a method for performing a random access procedure (RAP) for a device is disclosed, comprising: measuring downlink narrowband reference signal received power (NRSRP); determining narrowband physical random access (NPRACH) resources based on the measured NRSRP; receiving a maximum repetition level ($R_{max}$) comprising at least one repetition value; monitoring a Narrowband Physical Downlink Control Channel (NPDCCH) based on the maximum repetition value; detecting and decoding a NPDCCH signal based on the repetition value (R'); and transmitting a message (Message 3) from the device for initiating completion of the RAP; and transmitting downlink signal quality data based on the maximum repetition level.

In some illustrative embodiments, determining NPRACH resources comprises information from Radio Resource Control (RRC) signaling. In some illustrative embodiments, the RRC signaling comprises one or more RSRP thresholds and at least some of the NPRACH resources. In some illustrative embodiments, the NPRACH resources comprise a number of NPRACH repetitions and a maximum repetition level for monitoring NPDCCH.

In some illustrative embodiments, the method further comprises transmitting downlink signal quality data based on the repetition value.

In some illustrative embodiments, an apparatus configured to perform a random access procedure is disclosed, comprising: one or more antennae; a processing apparatus, operatively coupled to the one or more antennae, the processing apparatus being configured to: measure downlink narrowband reference signal received power (NRSRP); determine narrowband physical random access (NPRACH) resources based on the measured NRSRP; receive a maximum repetition level ($R_{max}$) comprising at least one repetition value; monitor a Narrowband Physical Downlink Control Channel (NPDCCH) based on the maximum repetition value; detect and decode a NPDCCH signal based on the repetition value (R'); and transmit a message from the device for initiating completion of the RAP.

DRAWINGS

Various features, nature and advantages may become apparent from the detailed description set forth below when taken in conjunction with the drawings in which like reference characters identify correspondingly throughout.

FIG. 5 shows a table for Narrowband Physical Downlink Control Channel (NPDCCH) UE-specific search space candidates for establishing resource allocation under an illustrative embodiment.

FIG. 8 shows a table for a plurality of multibit $R_{max}$ range identifiers for receiving associated repetition values for determining the length of repetition candidates under an illustrative embodiment.

DETAILED DESCRIPTION

Figure 1:
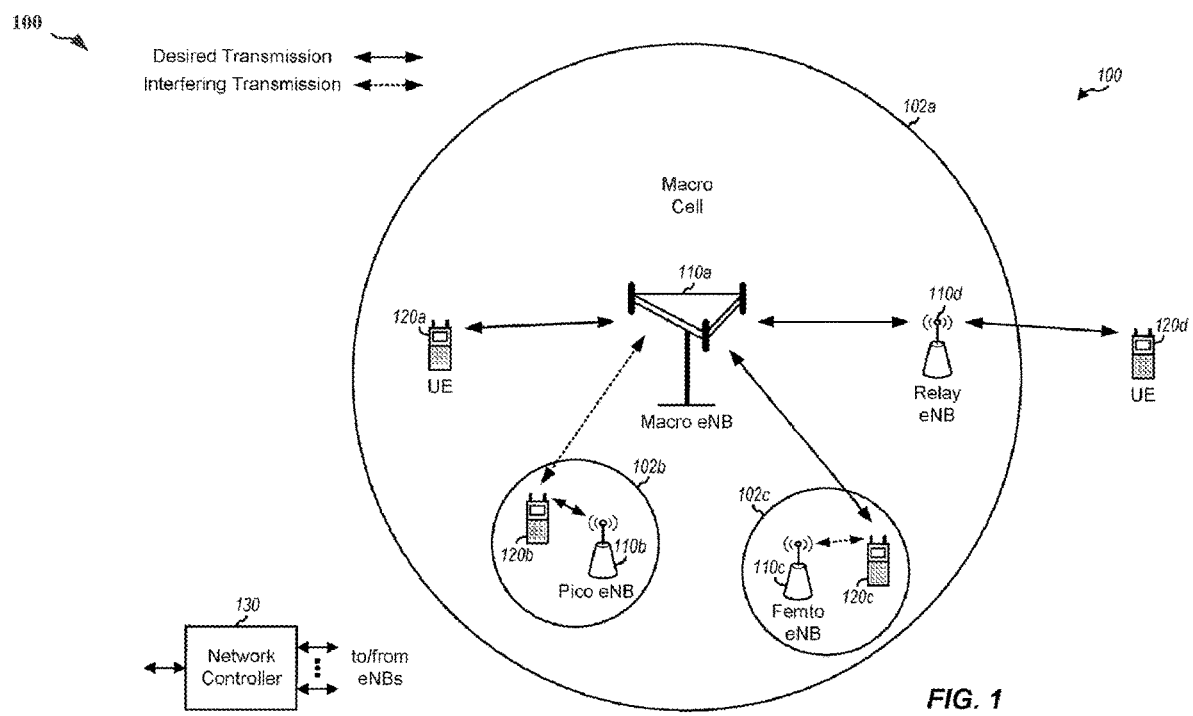
FIG. 1 is a simplified block diagram conceptually illustrating an example of a wireless communication network, in accordance with some illustrative embodiments of the present disclosure.

Some illustrative embodiments of the present disclosure generally relate to paging and random access procedures for Narrowband (NB) Internet-of-things (IoT). More specifically, aspects of the present disclosure provide various features relating to establishing a wireless connection for a UE device with a node, particularly under noisy environments.

In some illustrative embodiments, a base station (BS) may determine multiple sets of resources that are available for narrowband communications with UEs (e.g., IoT devices, legacy devices, etc.). The BS may determine an allocation of the available sets of resources to one or more of the UEs based, at least in part, on a type (or capability) of each UE. A type of a UE, for example, may refer to a version of a standard supported by the UE (e.g., whether the UE is a legacy UE, narrowband UE, advanced UE, etc.), one or more capabilities of the UE (e.g., whether the UE supports multiple physical resource block (PRB) operations for NB-IoT, whether the UE supports single tone/multi-tone transmission, etc.), etc.

Once the allocation is determined, the BS may signal an indication of the allocation to the UEs. The UEs, in turn, may use the indicated allocation to determine which of the multiple different sets of available narrowband resources to use for communication with the BS. In one reference example, a UE can use the indication to determine a set of resources to monitor for paging messages from the BS. In one reference example, a UE can use the indication to determine a set of resources to use for a narrowband physical random access (NPRACH) procedure.

The techniques described herein may be used for various wireless communication networks such as code division multiple access (CDMA) systems, time division multiple access (TDMA) systems, frequency division multiple access (FDMA) systems, orthogonal frequency division multiple access (OFDMA) systems, single carrier FDMA (SC-FDMA) systems, and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs 01-DMA on the downlink and SC-FDMA on the uplink UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation. These communications networks are merely listed as examples of networks in which the techniques described in this disclosure may be applied; however, this disclosure is not limited to the above-described communications networks. The techniques described herein may be used for the wireless networks and radio technologies mentioned above as well as other wireless networks and radio technologies. For clarity, some illustrative embodiments of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). UEs may include Internet-of-things (IoT) (e.g., NB-IoT) devices. Some examples of UEs may include cellular phones, smart phones, personal digital assistants (PDAs), wireless modems, wireless communication devices, cordless phones, wireless local loop (WLL) stations, music players, medical/healthcare devices, vehicular devices, navigation/positioning devices, handheld devices, tablets, laptop computers, netbooks, smartbooks, ultrabooks, wearables (e.g., smart watch, smart bracelet, smart glasses, virtual reality goggles, smart ring, smart clothing), displays (e.g., heads-up displays), entertainment devices (e.g., music players, game consoles), etc. Some UEs may be considered machine-type communication (MTC) UEs, which may include remote devices, such as drones, robots, sensors, meters, location tags, monitors, cameras, etc., that may communicate with a base station, another remote device, or some other entity. MTC devices, as well as other types of devices, may include internet of everything (IoE) or IoT devices, such as NB-IoT devices, and techniques disclosed herein may be applied to MTC devices, NB-IoT devices, as well as other devices. Machine type communications (MTC) may refer to communication involving at least one remote device on at least one end of the communication and may include forms of data communication which involve one or more entities that do not necessarily need human interaction.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, techniques presented herein may be used to perform paging and/or random access operations for narrowband IoT with single or multiple physical resource blocks (PRBs). In some illustrative embodiments, one or more of the UEs 120 (e.g., IoT devices) in the network 100 may have capabilities that are different compared to other UEs 120 in the network 100. In one example, some of the UEs 120 may have the capability to support multiple PRB operations for NB IoT, whereas some of the UEs 120 may have the capability to support single PRB operations for narrowband IoT.

In some illustrative embodiments, a base station (e.g., eNB 110) may determine different sets of resources that are available for narrowband communications with one or more different sets of UEs 120 (e.g., IoT devices). Each set of UEs 120 may include UEs of a particular type (or capability) (e.g., such as whether the UEs support multiple PRB operations for NB IoT). The eNB 110 may allocate the different sets of resources to the UEs 120 in the different sets based, at least in part, on the type of UEs 120. The eNB 110 may signal an indication of the allocation to the UEs 120.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. In FIG. 1, a solid line with double arrows indicates desired transmissions between a UE and a serving eNB, which is an eNB designated to serve the UE on the downlink and/or uplink A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12 and beyond, e.g., 5G releases) may monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/ 3/5/10/15/20 MHz). Additionally, narrowband UEs may also be able to support one or more coverage modes of operation.

For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
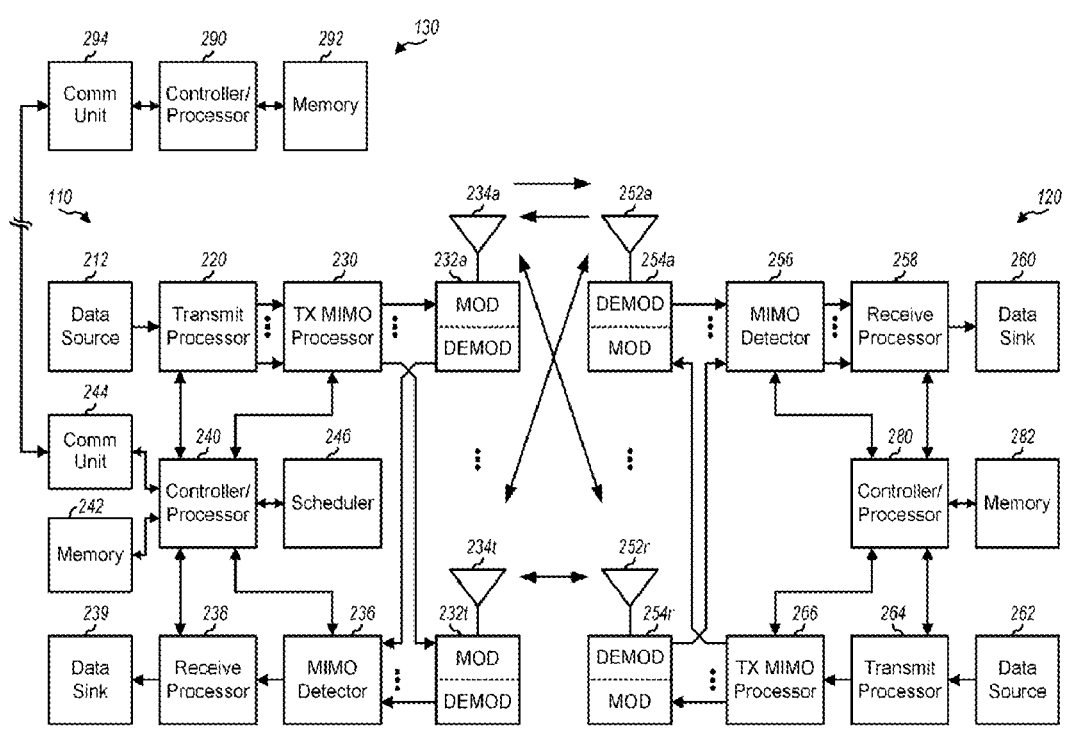
FIG. 2 shows a simplified block diagram conceptually illustrating an example of a base station in communication with a user equipment (UE) in a wireless communications network, in accordance with some illustrative embodiments of the present disclosure.

FIG. 2 shows a block diagram of a design of BS/eNB 110 and UE 120, which may be one of the BSs/eNBs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for 01-DM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for paging and/or random access procedures for narrowband IoT with multiple PRBs. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120 may perform or direct operations 700 in FIG. 7, operations 900 in FIG. 9, operations 1300 in FIG. 13, and/or other processes for the techniques described herein. Similarly, controller/processor 240 and/or other controllers/processors and modules at BS 110 may perform or direct operations 600 in FIG. 6, operations 800 in FIG. 8, operations 1000 in FIG. 10, operations 1100 in FIG. 11, operations 1200 in FIG. 12, operations 1300 in FIG. 13, and/or other processes for the techniques described herein. Memories 242 and 282 may store data and program codes for base station 110 and UE 120, respectively. A scheduler 246 may schedule UEs for data transmission on the downlink and/or uplink.

Figure 3:
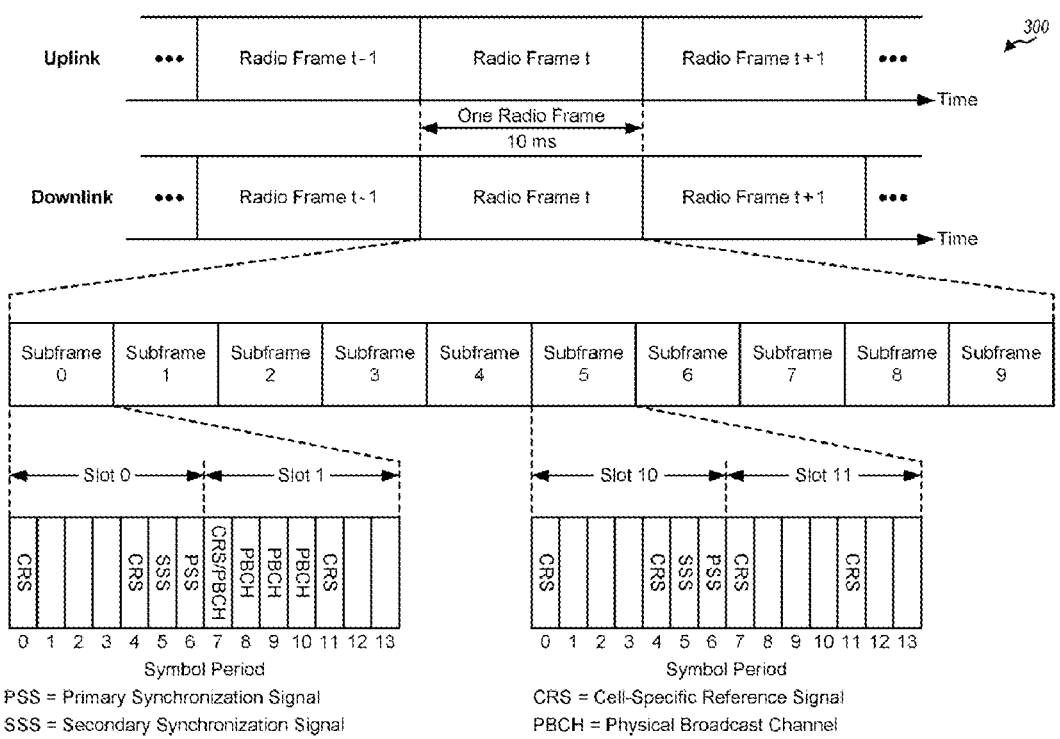
FIG. 3 is a block diagram conceptually illustrating an example of a frame structure in a wireless communications network, in accordance with some illustrative embodiments of the present disclosure.

FIG. 3 shows a simplified frame structure 300 for FDD in LTE under an illustrative example. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In the example of LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIB s) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
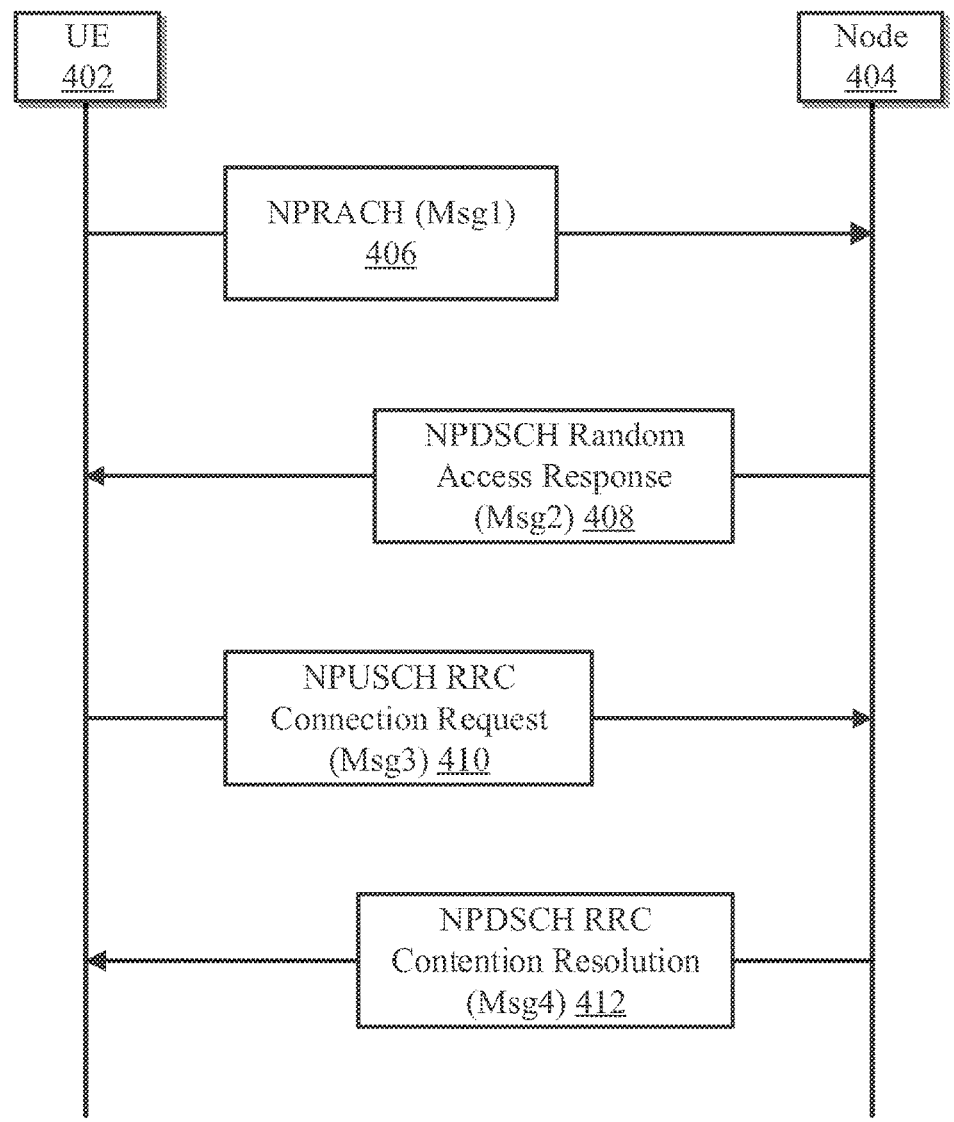
FIG. 4 shows a Narrowband Internet of things (NB-IoT) random access procedure used to initiate a data transfer between a UE and a node under an illustrative embodiment.

FIG. 4 shows an NB-IoT random access procedure 400 used to initiate a data transfer between a UE 402 and a node 404 under an illustrative embodiment. The UE 402 and node 404 may represent any of the UEs and eNBs, respectively, illustrated above in connection with FIG. 1.

Generally speaking, the UE 402 may be configured as a machine-to-machine (M2M) (also known as a Machine Type Communication (MTC)) device such as a mobile terminal, or any other suitable device, capable of transmitting data autonomously. During operation, the UE 402 triggers an access procedure to the node 404 (which may be a base station) in a plurality of operational situations:

1) Upon initial access to the network, i.e., in the association process;
2) When receiving or transmitting new data and the UE device is not synchronized;
3) Upon transmission of new data when no scheduling request resources are configured on the uplink control channel;
4) In the case of handover (change of associated base station), to avoid a session drop; and
5) After a radio link failure, in order to re-establish the connection.

In order to handle all these situations, two different forms of a Random Access (RA) procedure may be defined. One is considered contention-based, where devices compete for the channel access. Since collisions can occur, this type of access is reserved for delay-tolerant access requests. Another is a contention-free procedure, where the base station (e.g., eNodeB) allocates specific access resources for those access requests that must have high probability of success (delay-constrained access), such as handover. While the present disclosure may operate in a variety of environments, the present embodiment will focus on contention-based RA mechanisms used for the initial association to the network, for the request of resources for transmission, and to re-establish a connection upon failure.

When establishing connections, a Random-Access Channel (RACH) may be formed by a periodic sequence of allocated time-frequency resources, called RA slots. These slots are reserved in the uplink channel of the network for the transmission of access requests. In the time domain, the duration of each RA slot depends on the format of the access requests. In the frequency domain, each RA slot may occupy a predetermined bandwidth (e.g., 1.08 Mhz), which corresponds to the bandwidth of a plurality (e.g., 6) of Physical Resource Blocks (PRBs). The node 404 may broadcast the periodicity of the RA slots by means of a variable referred to as the Physical RACH (PRACH) Configuration Index. The periodicity may vary between a minimum of 1 RA slot every 2 frames, i.e., every 20 ms, and a maximum of 1 RA slot per 1 subframe, i.e., every 1 ms.

Typically, the RACH is allocated in the uplink and therefore, the scheduler design needs to balance the tradeoff between the amount of access opportunities to be scheduled per frame and the amount of resources available for data transmission. This can become an important factor in M2M applications, where the number of requesting devices can be very high and the available bandwidth is constrained.

As can be seen in the example of FIG. 4, a contention-based RA procedure may be configured as a four message handshake between the UE device 402 and the node 404. An access request will be completed if the four messages are successfully exchanged, as depicted in FIG. 4. Starting with block 406, the UE 402 provides a random access preamble transmission using a Narrow-Band Physical Random Access Channel (NPRACH) on Message 1 (Msg1). Typically, whenever the UE 402 requires access to a channel, it may select the next available RA slot of the NPRACH to transmit an access requests. This may comprise a preamble, (e.g., a digital signature) that the UE 402 transmits in an RA slot. In some illustrative embodiments, there may be 48 or 64 orthogonal pseudo-random preambles available for RA and the node 404 may periodically broadcast information in the downlink control channel on which preambles may be used. However, the node 404 may reserve some of them for contention-free access. If two or more devices transmit the same preamble in the same RA slot, a collision may occur.

Otherwise, the different preambles can be detected by the node 404 due to their orthogonality. Typically, the larger the cell-size, the longer the duration of the preamble will be in order to improve the reliability of reception at the cell edge. The selection of the preamble to transmit for each request may be done at random (among those available for contention-based access). Using a plurality (e.g., 3) of subframes after the transmission of the preamble, the UE 402 may wait for a time window to receive a response from the node 404, (e.g., Message 2 408) of the handshake. The duration of this waiting window may be broadcast by the node 404 and may be defined for a given period (e.g., between 2 and 10 subframes).

The random access response (RAR) 408 may be configured to be communicated via Narrow-Band Physical Downlink Shared Channel (NPDSCH). For each successfully decoded preamble, the node 404 may compute an identifier, (e.g., Random Access Radio Network Temporary Identifier (RA-RNTI)), which may be calculated based on the RA slot where each preamble was sent. Then, the node 404 may transmit a random access response through the NPDSCH with additional information, including identification of the detected preamble, timing alignment instructions to synchronize uplink transmissions, uplink resource allocation that will be used by the UE 402 to transmit the third message of the handshake, an assigned Temporary Cell Radio Network Temporary Identifier (C-RNTI), and/or, in the case of failure, an optional Backoff Indicator (BI).

The random access response 408 (also referred to as Message 2) may contain different subheaders associated to each detected preamble. If a device (e.g., UE 402) receives a random access response message addressed to the RA-RNTI associated to the RA slot where the preamble was transmitted, but it does not contain the identifier of the used preamble, it may perform a random backoff time (according to the BI parameter attached to the random access response) before scheduling another preamble transmission attempt (Message 1).

The UE 402 provides a narrowband physical uplink shared channel (NPUSCH) RRC Connection Resume Request 410 (also referred to as Message 3) to the node 404 in the resources granted in the Message 2 associated to the preamble transmitted in the selected RA slot. Message 3 410 may be transmitted with Hybrid Automatic Retransmission Request (HARQ). For the initial access, this message may include the device identifier (C-RNTI) and the reason for the access request. Message 3 410 may be transmitted as a scheduled message in order to start the contention resolution process. The associated contention resolution message may be transmitted to the UE 402 in order to indicate the successful completion of the RACH procedure.

Upon transmission of the preamble, the UE 402 may first calculate its RA-RNTI from the transmission time. It looks then in the NPDCCH for the Downlink Control Information (DCI) format N1 scrambled with the RA-RNTI, which schedules the NPDSCH that includes the random access response. The UE 402 expects this message within the Response Window, which may start in a plurality (e.g., 3) subframes after the last preamble subframe and has a coverage enhancement (CE) dependent length given in a system information block (e.g., SIB2-NB). If the preamble transmission was not successful, i.e. the associated random access response (RAR) message was not received, the UE 402 may transmit another one. This may be done up to a maximum number, which again is depending on the CE level. For the case that this maximum number is reached without success, the UE proceeds to the next CE level, if this level is configured. If the total number of access attempts is reached, an associated failure is reported to the RRC. With the random access response, the UE 402 may obtain, in addition to a temporary C-RNTI, the timing advance command Consequently, the following Message 3 410 is already time aligned, which is necessary for transmission over the NPUSCH. Further, the random access response provides the UL grant for Message 3 410, containing all relevant data for the Message 3 410 transmission.

Upon reception of Message 3 410, the node 404 may transmit a Contention Resolution message 412 (also referred to as Message 4) in response to Message 3 410. If the UE 402 does not receive Message 4 412, it declares a failure in the contention resolution and schedules a new access attempt, i.e., a new preamble transmission, starting the process over again. Each UE 402 may be configured to keep a preamble transmission counter that is increased after each unsuccessful attempt. When the counter reaches the maximum allowed value (informed as system information by the node 404), the network is declared unavailable by the device and a random access problem is indicated to upper layers.

When utilizing NPDCCH and NPDSCH channels, the use of repetitions may be advantageous in improving communications between a UE 402 and node 404. Generally speaking, repetition is a technique where the same transmission may be repeated several times. Each repetition may be self-decodable, and a scrambling code and/or redundancy version may be utilized and changed for each transmission to help combination. In some illustrative embodiments, repetitions may be acknowledged (ACK) just once.

For connected mode procedures, including random access procedure, such as that described in FIG. 4, devices, such as the UE 402 may be configured to utilize NPDCCH search spaces for performing connected mode scheduling as well as idle mode paging. Generally speaking, a search space may be defined as one or more subframes in which a device may search for DCI addressed to the device. For example, a plurality of search spaces may include a Type-1 search space, a Type-2 search space, and/or a UE-specific search spaces (USS). The Type-1 search space may be used for monitoring paging. The Type-2 search space may be used for monitoring random access responses, Message 3 HARQ retransmissions, and Message 4 radio resource assignments. The UE-specific search spaces (USS) may be used for monitoring downlink (DL) or uplink (UL) scheduling information.

For a Type-2 search space, which may be utilized in some illustrative embodiments, the search space contains a number of parameters for defining NPDCCH search spaces. For example, these parameters may include a maximum repetition factor ($R_{max}$) of NPDCCH, an offset ($\alpha_{offset}$) of a starting subframe in a search period, a parameter G used to determine a search period, and search space period T. For example, the parameter T may represent a number of subframes and may be defined as $T=R_{max}G$. The parameters $R_{max}$, $\alpha_{offset}$, and G may be configured to be signaled in the system information block SIB2-NB. $R_{max}$ may be configured according to a NPRACH coverage class (see FIG. 7) it is associated to.

Turning to the table 500 illustrated in FIG. 5, the $R_{max}$ values 502 may be configured such that $R_{max}$, or the maximum number of repetitions for NPDCCH, may be set to 1, 2, 4, 8 or greater. The number of repetitions R (NPDCCH repetition factor) are then configured as shown in 504 to correspond to each $R_{max}$ value. Thus $R_{max}$ of 1 results in only 1 repetition, an $R_{max}$ of 2 may result in 1 or 2 repetitions, an $R_{max}$ of 4 may result in 1, 2, or 4 repetitions, while an $R_{max}$ of 8 or greater results in repetitions of $R_{max}/8$, $R_{max}/4$, $R_{max}/2$, or $R_{max}$. Furthermore, each repetition value R 504 has a corresponding DCI subframe repetition number 506. Moreover, each repetition value R 504 may have a corresponding Number of CCE's available for PDCCH (NCCE) and indices of monitored NPDCCH candidates 508 with aggregation levels (L') 1 or 2 for transmitting a DCI. With L'=1, two DCIs may be multiplexed in one subframe, otherwise one subframe only carries one DCI (e.g., L'=2), giving rise to a lower coding rate and improved coverage. The NCCE may be considered a resource allocation unit for PDCCH. The NCCE may be configured under a plurality of formats (Format 0 and Format 1), where NPDCCH Format 0 takes up only one NCCE and NPDCCH format 1 takes up two NCCEs.

Within a search period, the number of subframes a UE (e.g., UE 402) needs to monitor may be set to $R_{max}$ and the number of search space candidates defined may also be based on $R_{max}$. In some illustrative embodiments, the $R_{max}$ subframes that the UE 402 needs to monitor within a search period may exclude the subframes used for transmitting Narrowband Physical Broadcast Channel (NPBCH), Narrowband Primary Synchronization Signal (NPSS), Narrowband Secondary Synchronization Signal (NSSS) and system information (SI). Also, these subframes should be NB-IoT subframes according to a valid subframe bitmap.

Figure 6:
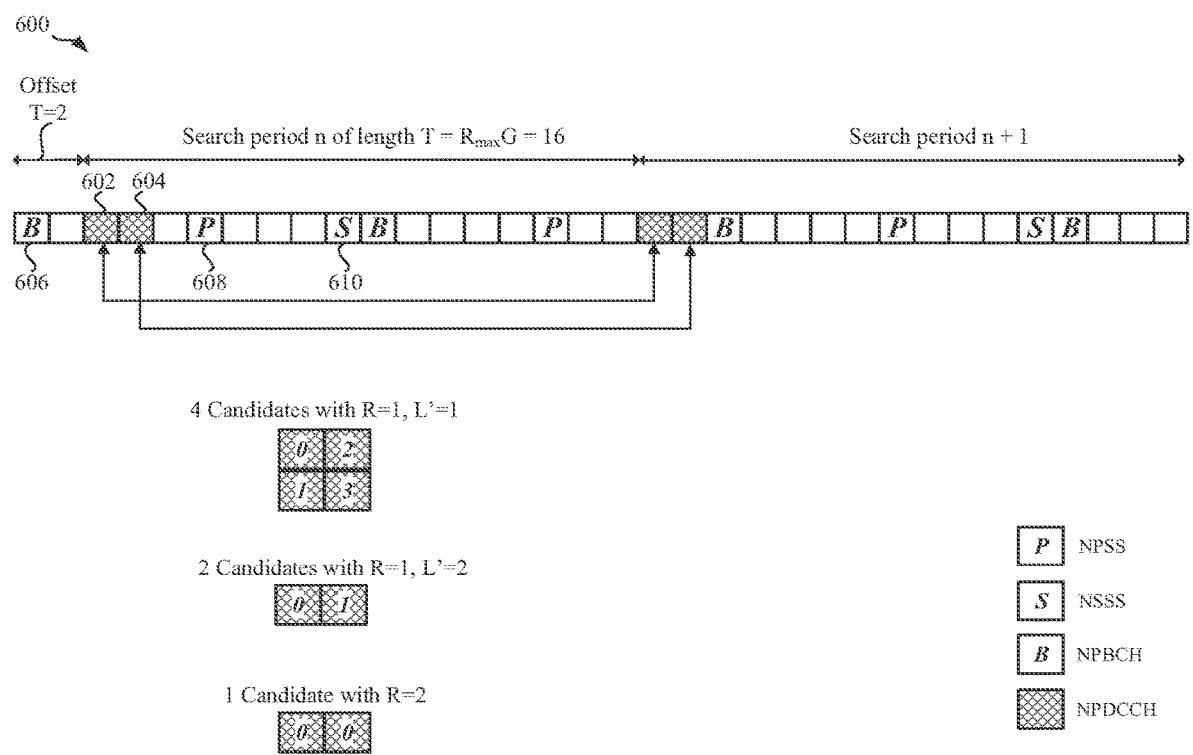
FIG. 6 shows a simplified example of a search space configuration for a UE under an illustrative embodiment.

Turning to FIG. 6, a simplified example is provided of a search space configuration, illustrating a UE (e.g., UE 402) in coverage conditions requiring the NPDCCH to be transmitted with up to 2 repetitions. As such, $R_{max}$ in this example will be set to 2. It is assumed in this example that the scheduling periodicity is configured to be eight times longer than the maximum repetition level (G=8). Additionally, an offset $\alpha_{offset}$ of ⅛ is selected. Using these parameters, it can be seen that the search period is $T=R_{max}G=16$ subframes. As the offset value is set to ⅛ of the search period, the starting subframe is shifted by two subframes.

As can be seen from the table in FIG. 5, with $R_{max}=2$, the search space may have a NPDCCH repetition value R=1 or R=2. Furthermore, for the case of R=1, L'=1 may be used and thus both NCCE0 and NCCE1 may be used jointly as a search candidate. All the search space candidates are illustrated in FIG. 6, including the following set of candidates within a search period:

4 candidates with R=1 and L'=1
2 candidates with R=1 and L'=2 and
1 candidate with R=2.

During operation, the UE (e.g., UE 402) may monitor a set of search space subframes (e.g., subframes 602, 604) that are not taken by a Narrowband Physical Broadcast Channel (NPBCH) (e.g., subframe 0 606 in FIG. 6), Narrowband Primary Synchronization Signal (NPSS) (e.g., subframe 5 608 in FIG. 6), Narrowband Secondary Synchronization Signal (NSSS) (e.g., subframe 9 610 in FIG. 6, in even numbered SFN), and system information (SI).

Figure 7:
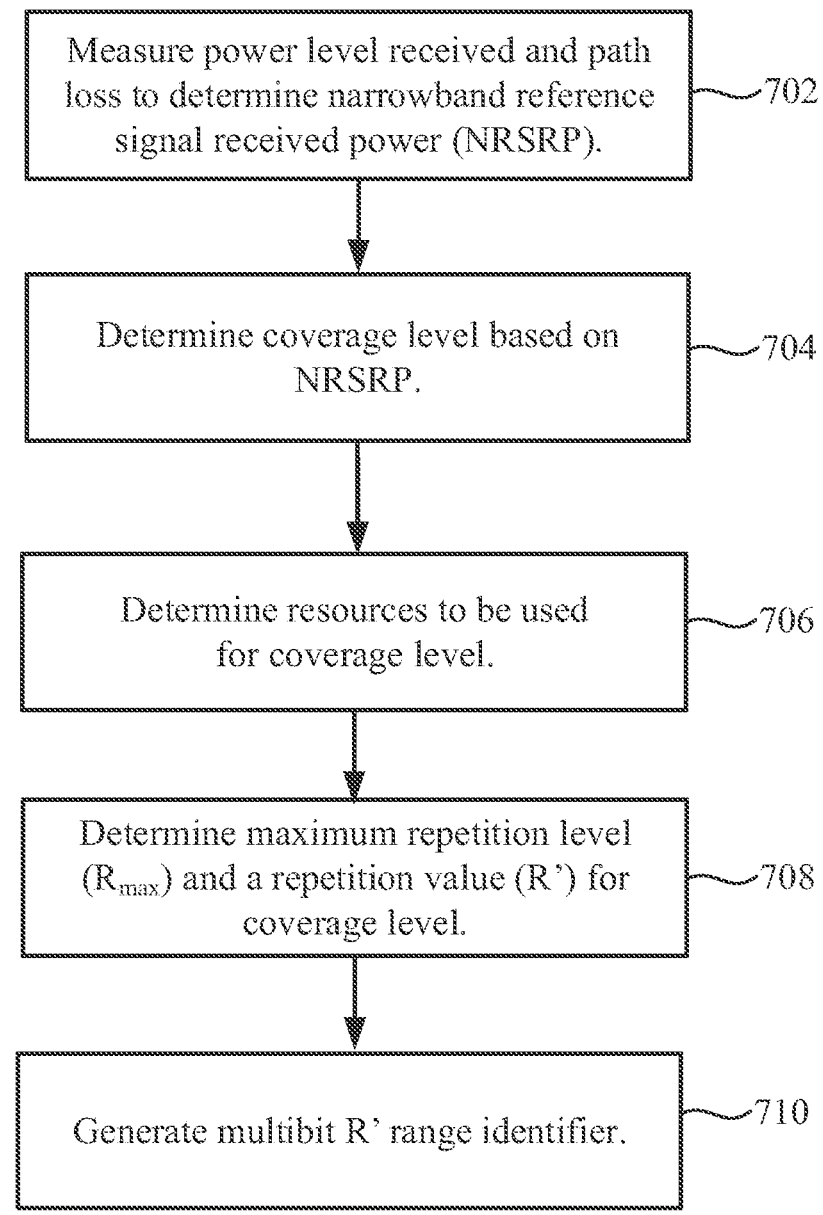
FIG. 7 shows a flow diagram for determining a coverage level for a maximum repetition level ($R_{max}$) to generate a multibit R' range identifier for determining the length of repetition candidates under an illustrative embodiment.

FIG. 7 shows a flow diagram 700 for determining a coverage level (or coverage class) for a maximum repetition level ($R_{max}$) to generate a multibit (R') range identifier for determining length of repetition candidates under an illustrative embodiment. In block 702, the UE (e.g., UE 402) may measure or estimate a power level received and a path loss to determine narrowband reference signal received power (NRSRP) and compare the signal to one or more thresholds for NRSRP. From this comparison, the UE may determine up to three different coverage levels in block 704 that may be signaled via SIB2-NB. For example, the three coverage levels may include a normal level, a robust level and an extreme level. Each coverage level may be configured with an associated coverage enhancement level of 0, 1 and 2, respectively. Furthermore, each coverage level may be configured with an associated maximum coupling loss of 144 dB, 154 dB and 164 dB, respectively. The coverage level selected determines the resources to be used in block 706, including NPRACH resources, such as a subset of subcarriers, NPRACH repetitions, max number of attempts, etc. In addition to power levels/loss, block 702 may also perform channel quality measurements to determine signal-to-noise ratio (SNR), signal-to-interference plus noise ratio (SINR) and/or signal-to-noise plus distortion ratio (SNDR). The measurements in block 702 may include Received Signal Strength Indicator (RSSI), Received Signal Received Power (RSRP) and/or Received Signal Received Quality (RSTQ), or any other suitable signal that allows UE to determine signal quality.

In block 708, the UE determines a maximum repetition level ($R_{max}$) and a repetition value (R') for the coverage level. R' may be a positive integer indicating a number of repetitions. In some illustrative embodiments, R' may be calculated, estimated and/or based on a repetition factor (number) that the UE requires to decode NPDCCH with a minimum block error rate (BLER). In some illustrative embodiments, the BLER may be set at 1%, although those skilled in the art will understand that other suitable BLER values may be utilized, depending on the application. Based on the determined R', the UE at block 710 may generate a multibit R' range identifier. This multibit R' range identifier may then be utilized in the system to determine candidate lengths for repetition R'.

FIG. 8 shows a table 800 for a plurality of multibit R' range identifiers for receiving associated repetition factors for determining the length of repetition candidates under an illustrative embodiment. As can be seen from table 800, the different $R_{max}$ values 802 (1-2048) are shown in the top row of the table. In this example, each of the multibit R' range identifiers 810 are represented as two bits (e.g., '01', '10' and '11'). For each multibit R' range identifier, a specific repetition instruction may be provided for obtaining R'. In this example, '00'=not supported/legacy UE
'01'=requires R'<$R_{max}$/2
'10'=requires R' between $R_{max}$/2 and $2R_{max}$
'11'=requires R'>$2R_{max}$.

As can be seen in the table 800, the multibit R' range identifier '01' produces repetition values $R_{max}$/2, shown in row 804 (1-512). Similarly, multibit R' range identifier '01' produces repetition values between $R_{max}$/2 and $2R_{max}$, shown in row 806 (2-1024), and multibit R' range identifier "11" produces repetition values >$2R_{max}$, shown in row 808 (4-2048). It should be understood by those skilled in the art that the two-bit example is but one example, and that the concept may be extended to greater numbers of bits (e.g., 3 bits, with 7 entries each). By using such a configuration, UEs (e.g., UE 402) may advantageously signal a smallest repetition value that meets NPDCCH decoding requirements at or under a predetermined BLER, thus increasing efficiency and preserving UE resources.

Figure 9:
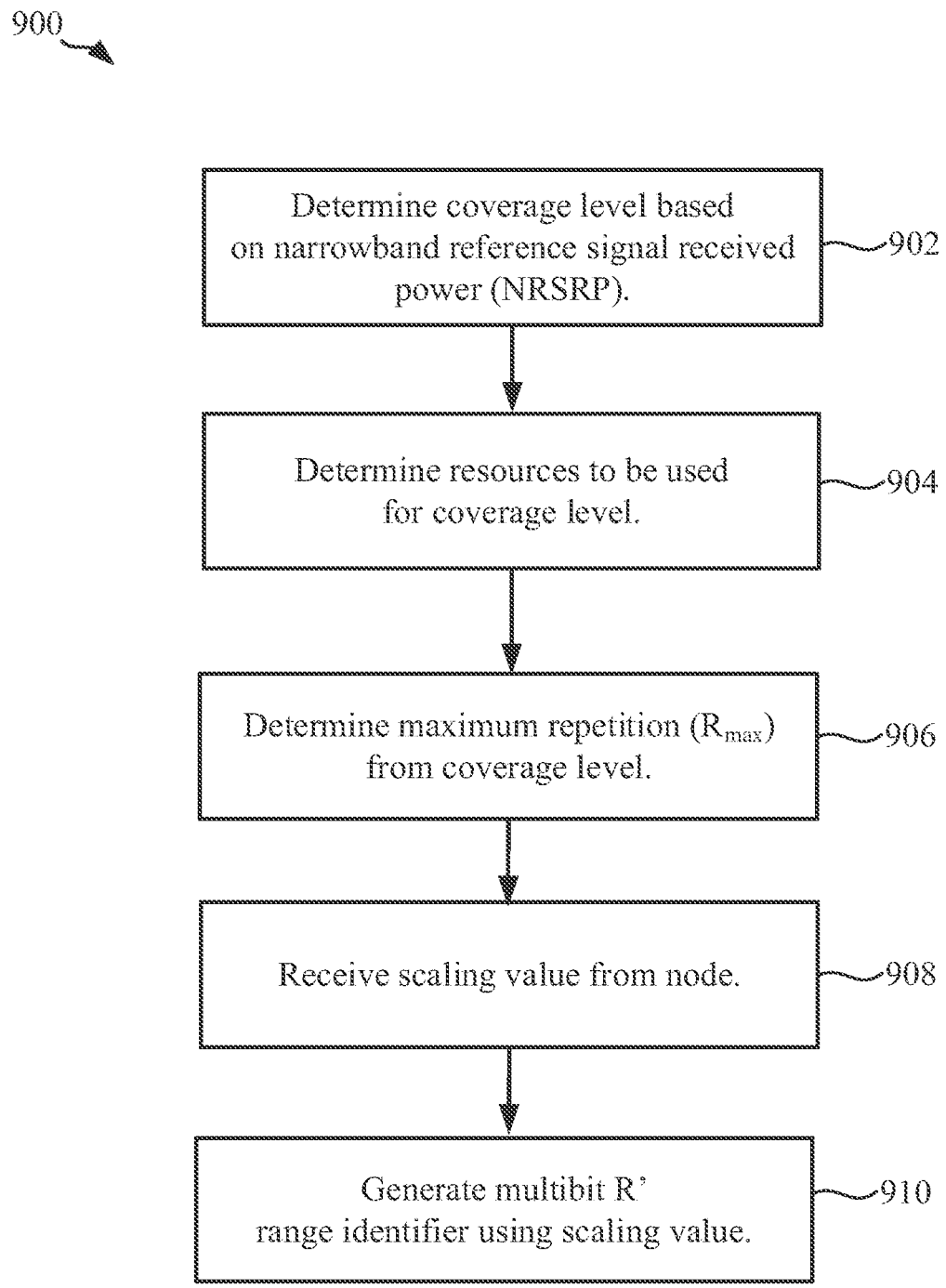
FIG. 9 shows a flow diagram for determining a coverage level for $R_{max}$ to generate a multibit R' range identifier using a scaling value for determining the length of repetition candidates under an illustrative embodiment.

In another illustrative embodiment, FIG. 9 shows a flow diagram 900 for determining a coverage level for $R_{max}$ to generate a multibit R' range identifier (also referred to as a multibit repetition range identifier) using a scaling value for determining the length of repetition candidates. In blocks 902-906, the UE determines the coverage level, resources to be used, and $R_{max}$, similar to the technologies and techniques described above in blocks 702-706 in connection with FIG. 7, and the table 800 of FIG. 8. In block 908, the UE receives a scaling value S from a node (e.g., node 404). In block 910, the UE may generate multibit R' range identifiers using the scaling value for determining R candidates. In one example, the node (e.g., node 404) may signal a scaling value of S, where S={2, 4, 8}. When generating multibit R' range identifiers using a 2-bit example, the UE may use the following configuration:

00=not supported/legacy UE
01=requires R'<$R_{max}$/S
10=requires R' between $R_{max}$/S and $S*R_{max}$
11=requires R'>$S*R_{max}$.

It should be understood by those skilled in the art that the two-bit example is only one example, and that the concept may be extended to greater numbers of bits. By using such a configuration, UEs (e.g., UE 402) may advantageously scale R to meet NPDCCH decoding requirements, particularly in very noisy (or barely noisy) environments.

Figure 10:
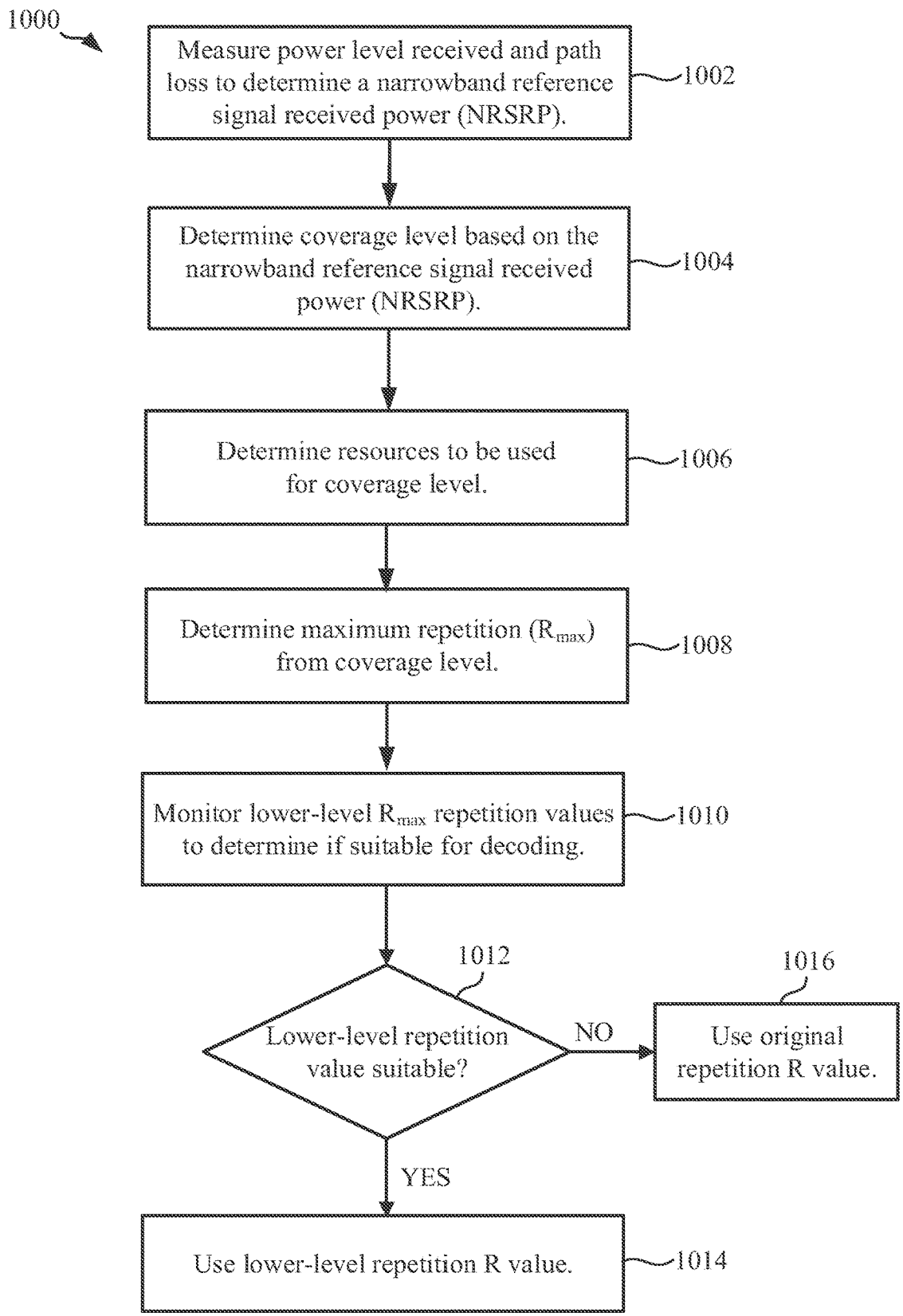
FIG. 10 shows a flow diagram for determining $R_{max}$ and to monitor lower-level $R_{max}$ values suitable for use for a random access procedure under an illustrative embodiment.

In another embodiment, FIG. 10 shows a flow diagram 1000 for determining $R_{max}$ and to monitor lower-level R values suitable for use for a random access procedure. In this example, the determining of NRSRP, the associated coverage level, resources to be used, and maximum repetition $R_{max}$ performed in blocks 1002-1008 are similar to blocks 702-708 described above in connection with FIG. 7. However, in block 1010, instead of using the $R_{max}$ value, the UE (e.g., UE 402) monitors lower-level R values in block 1012 to determine if any of those R values are suitable for decoding. In one example, referring back to table 800 of FIG. 8, the UE (e.g., UE 402) may determine $R_{max}$=16 for a coverage level 01, meaning an R repetition value of 8 will be used as a candidate. In the embodiment of FIG. 10, the UE (e.g. UE 402) may monitor a predetermined number (e.g., 3) of lower-level R repetition values for the given $R_{max}$ to calculate if a lower R value is still suitable for meeting NPDCCH decoding requirements. Thus, given the initial R value of 8, the UE (e.g., UE 402) may monitor R values 4, 2 and 1, and, if any of those lower repetition R values (e.g., 4) are suitable for decoding, the UE (e.g., UE 402) uses the lower repetition R value in block 1014. If none of the lower repetition R values are suitable for meeting NPDCCH decoding requirements, the UE continues with the original repetition R value in block 1016. In some illustrative embodiments, the used R value may be carried in the DCI.

In order to determine NPDCCH decoding requirements (e.g., ≤1% BLER), the UE (e.g., UE 402) may be configured to process a "virtual NPDCCH" in a manner similar to processing channel state information (CSI) in an LTE environment utilizing Physical Downlink Shared Channel (PDSCH). CSI refers to channel properties of a communication link, and this information describes how a signal propagates from the transmitter to the receiver and represents the combined effect of, for example, scattering, fading, and power decay with distance. The CSI makes it possible to adapt transmissions to current channel conditions, which is used for achieving reliable communication with high data rates in multiantenna systems. CSI may be estimated at the receiver and usually quantized and fed back to the transmitter (although reverse-link estimation is possible in TDD systems). Therefore, the transmitter and receiver can have different CSI.

Figure 11A:
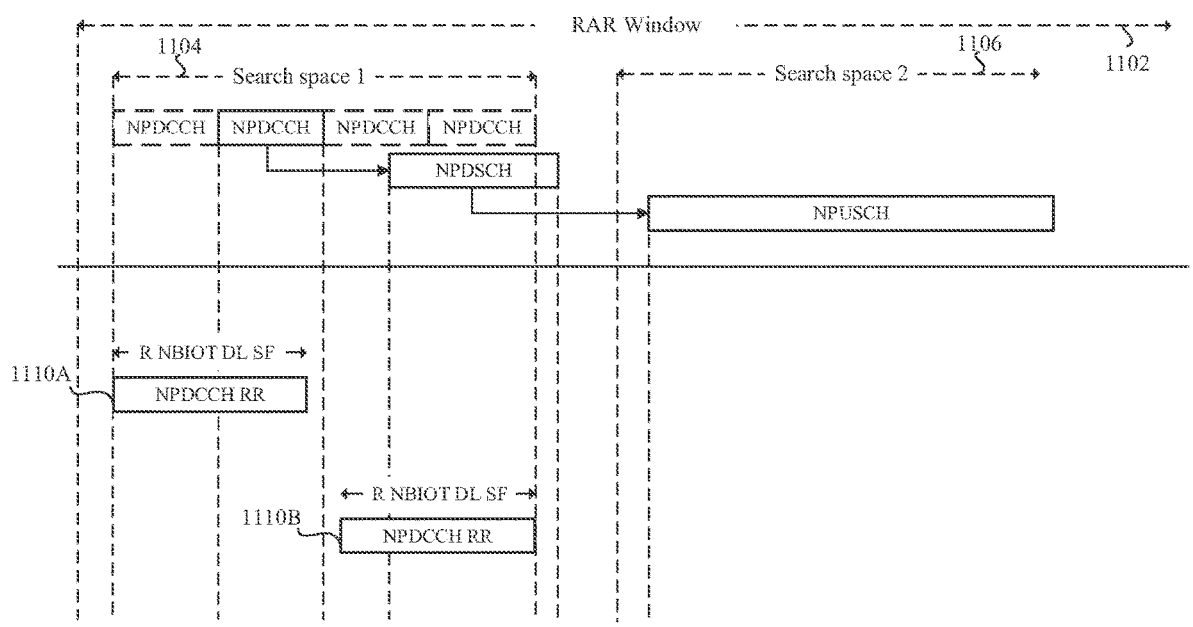
FIG. 11A shows a simplified random access response (RAR) Window under an illustrative embodiment, as well as certain techniques for defining a Narrowband Physical Downlink Control Channel (NPDCCH) under illustrative embodiments.

In the present disclosure a NPDCCH reference resource (configured as a modified CSI reference resource) may be used estimating/determining NPDCCH decoding requirements and reporting a number of repetitions. FIG. 11A shows a simplified random access response (RAR) Window 1102 under an illustrative embodiment, as well as certain techniques for defining NPDCCH. In the example, RAR window 1102 is illustrated as having two search spaces 1104, 1106, where search space 1 1104 is disclosed as covering the downlink, while search space 2 1106 is covering the uplink. As can be seen from the figure, an NPCCH candidate may be selected from a plurality of candidates, and carried on the NPDSCH to establish uplink via NPUSCH.

In the example of 1110A, a NPDCCH reference may be defined with respect to the search space in which a random access response grant is received. For example, the NPDCCH reference resource is the R narrowband downlink subframes (NB-IoT DL SF) starting from the start of the search space 1104 scheduling the random access response. In the example of 1110B, the NPDCCH reference resource is the R narrowband downlink subframes (NB-IoT DL SF) starting from the end of the search space 1104 scheduling random access response.

Figure 11B:
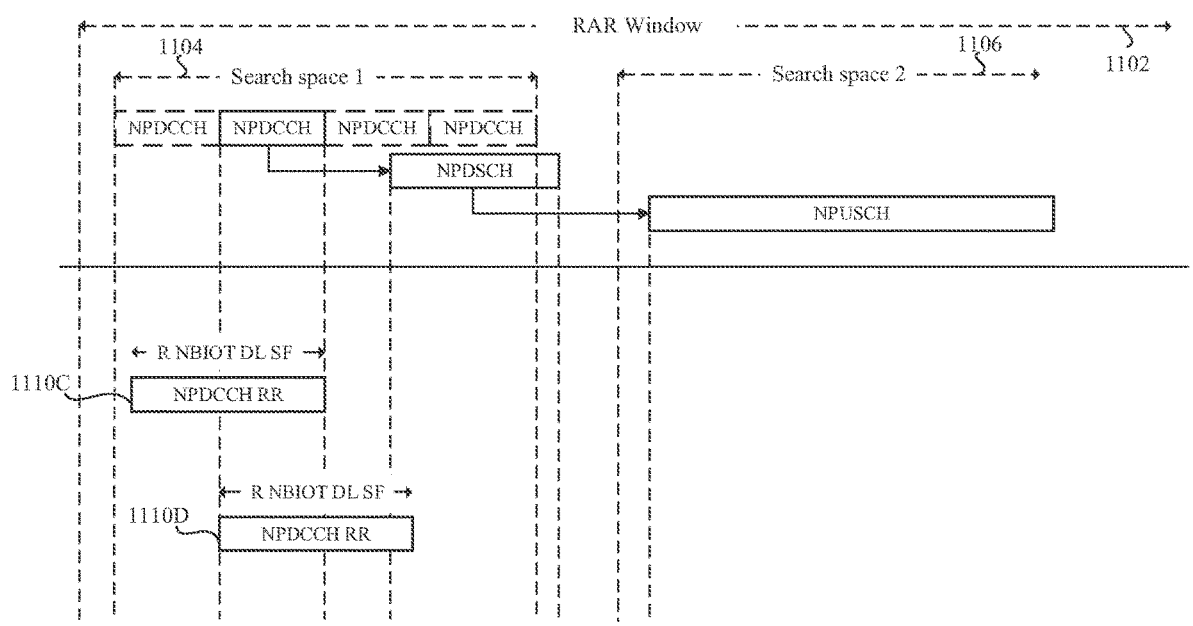
FIG. 11B shows certain techniques for defining a Narrowband Physical Downlink Control Channel (NPDCCH) using the RAR Window of FIG. 11A under illustrative embodiments.

Turning to FIG. 11B, the figure continues the RAR window 1102 configuration of FIG. 11A. In the example of 1110C, an NPDCCH reference may be defined with respect to the NPDCCH in which a DCI scheduling random access response is received. For example, the NPDCCH reference resource is the previous R NB-IoT DL subframes (SFs) starting from the end of the NPDCCH scheduling random access response. In the example of 1110D, the NPDCCH reference resource is the previous R NB-IoT DL subframes starting from the beginning of the NPDCCH scheduling random access response.

Figure 11C:
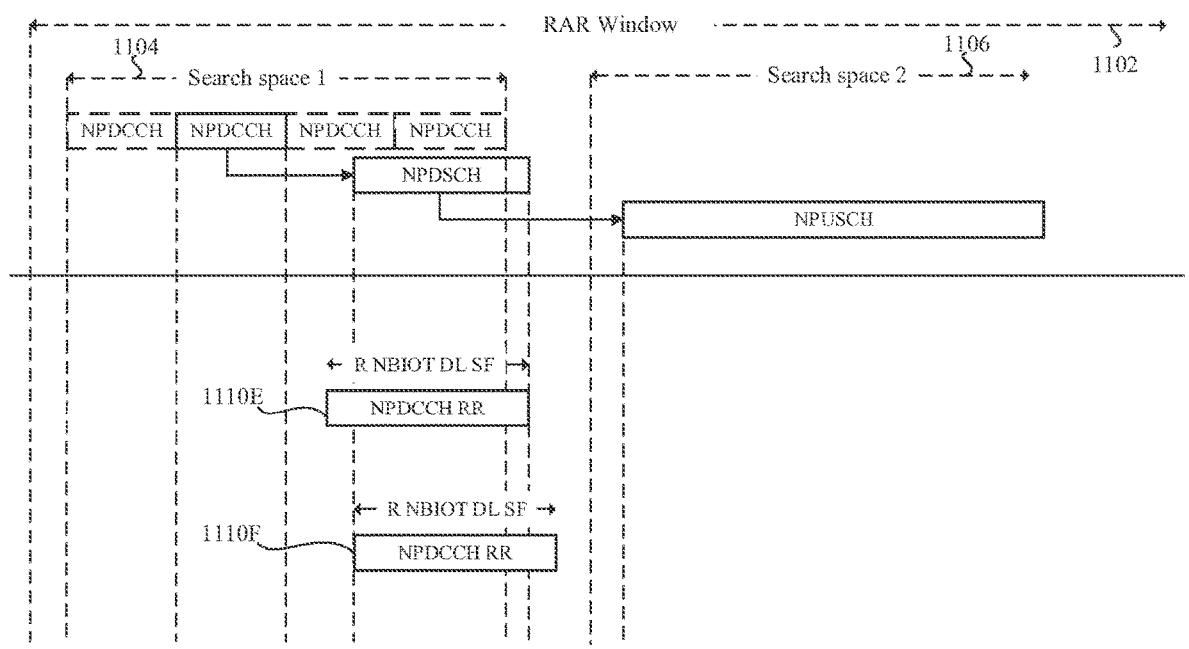
FIG. 11C shows further techniques for defining a Narrowband Physical Downlink Control Channel (NPDCCH) using the RAR Window of FIG. 11A under illustrative embodiments.

Turning to FIG. 11C, the figure continues the RAR window 1102 configuration of FIG. 11A. In the example of 1110E, an NPDCCH reference may be defined with respect to the NPDSCH carrying Msg2. For example, the NPDCCH reference is defined from previous R NB-IoT DL subframes starting from the end of the NPDSCH carrying random access response as shown in the figure. In the example of 1110F, the NPDCCH reference is defined from previous R NB-IoT DL subframes starting from the beginning of the NPDSCH carrying random access response.

Figure 11D:
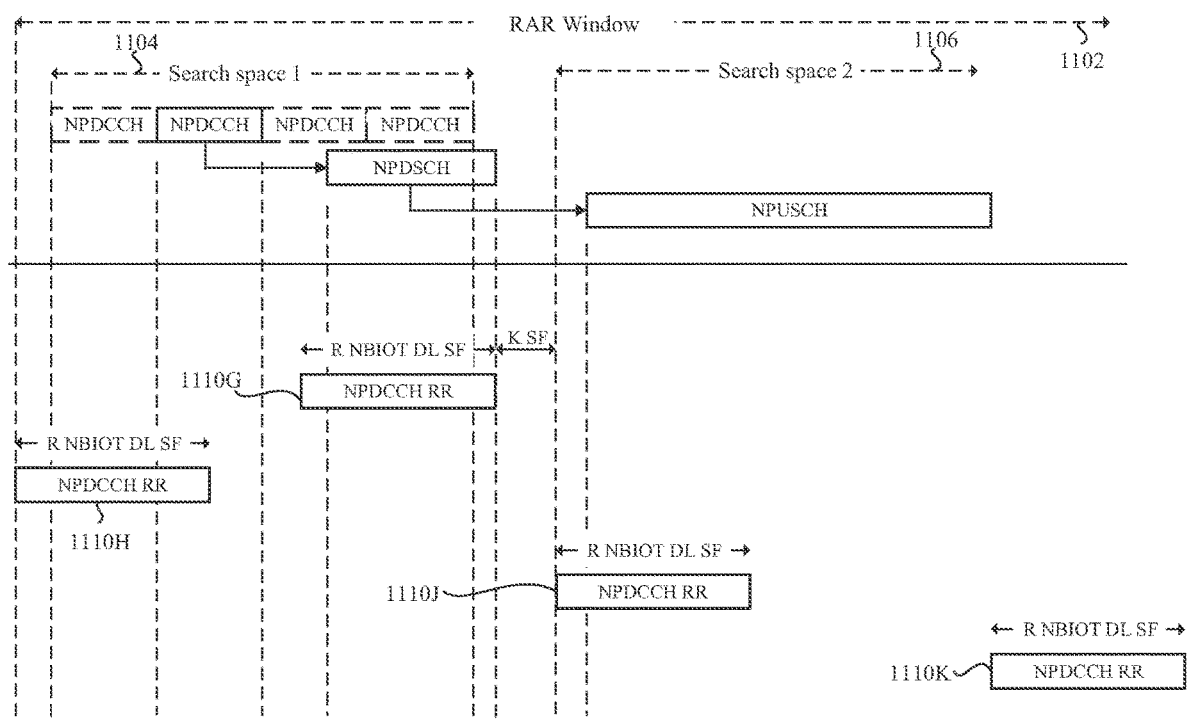
FIG. 11D shows still further techniques for defining a Narrowband Physical Downlink Control Channel (NPDCCH) using the RAR Window of FIG. 11A under illustrative embodiments.

Turning to FIG. 11D, the figure continues the RAR window 1102 configuration of FIG. 11A. In the example of 1110G, an NPDCCH reference may be defined with respect to the Message 3 transmission. For example, if N is the subframe for the first NPUSCH subframe carrying Message 3, then the NPDCCH reference resource may be defined as the R NB-IoT DL subframes before N+k. In the example of 1110H, the NPDCCH reference may be defined with respect to the start of the RAR window 1102, e.g., the first R NB-IoT DL subframes within the RAR window 1102. In the example of 1110J, the NPDCCH reference may be defined with respect to the last NPDCCH search space in the RAR window. In the example of 1110K, the NPDCCH reference may be defined with respect to after the transmission of Message 3. In this example, this configuration would be equivalent to a "long term SNR", since the UE has to guess or estimate what the future channel state will be. Those skilled in the art will recognize that the embodiments of FIGS. 11A-D considers 'NB-IoT DL subframes', e.g., the subframes over which NPDCCH cannot be transmitted are not counted.

The present disclosure also provides different options for establishing measurement resources. In one example, the measurement resources may be the same used in legacy LTE (unrestricted in time and frequency). In this case, "unrestricted" may be configured with respect to subframes in the same NB-IoT carrier that carry a Narrowband Reference Signal (NRS). Under this configuration, the UE (e.g., UE 402) can filter NRS (depending on the Doppler) to estimate SNR in the CSI reference resource. In another example, measurement resources may be allocated during the subframes that are determined to carry NRS in the random access response window.

In some illustrative embodiments, it may be assumed that the NPDCCH reference resource (FIGS. 11A-D) is placed in the same carrier as the RAR is transmitted. However, for multicarrier operation, it is possible that the node (e.g., node 404) reconfigures the UE with a different NB-IoT carrier for unicast operation. In such case, the RAR CSI information may be ignored, since it is measured in a different NB-IoT carrier. As such, the UE (e.g., UE 402) may be allowed to report the RAR CSI information during connected mode. In this case, the NPDCCH reference resource can be defined in a similar way as FIGS. 11A-D, but replacing the common search space (e.g., 1104, 1106) by UE specific search space. As such, the CSI trigger can be configured in DCI or in MAC control element (MAC CE). In the case of MAC CE, a different Radio Network Temporary Identifier (RNTI) may be needed to avoid sending an early ACK and send NPUSCH with MAC CE instead. Another option for multicarrier operations is to have periodic reporting (e.g. configured by RRC), where the target R can be transmitted in MAC CE The technologies and techniques disclosed herein may be optimized in additional ways. For example, when measuring the SNR, the UE (e.g., UE 402) can use NPDCCH/NPDSCH decoded bits to reconstruct the transmitted signal and have additional observations. For this, the node (e.g., 404) may signal a T2P (traffic to pilot ratio) for both NPDCCH/NPDSCH for measurement purposes as described above. The node (e.g., node 404) may also signal if the UE (e.g., UE 402) is allowed to use reconstructed NPDCCH/NPDSCH for measurement.

In some illustrative embodiments, the support of Message 3 reporting is enabled by the node (e.g., node 404) in SIB. The node (e.g., node 404) may then report whether it understands and/or uses the bits in Message 3. If the field is present in SIB, then the UE (e.g., UE 402) will perform measurements and report. Otherwise, the UE (e.g., UE 402) can just transmit zeros (or, alternatively, transmit anything, since the eNB will not look into those bits). As another alternative, the node (e.g., node 404) may send information to enable this in the RAR grant (i.e., the PDSCH carrying Message 2).

Figure 12:
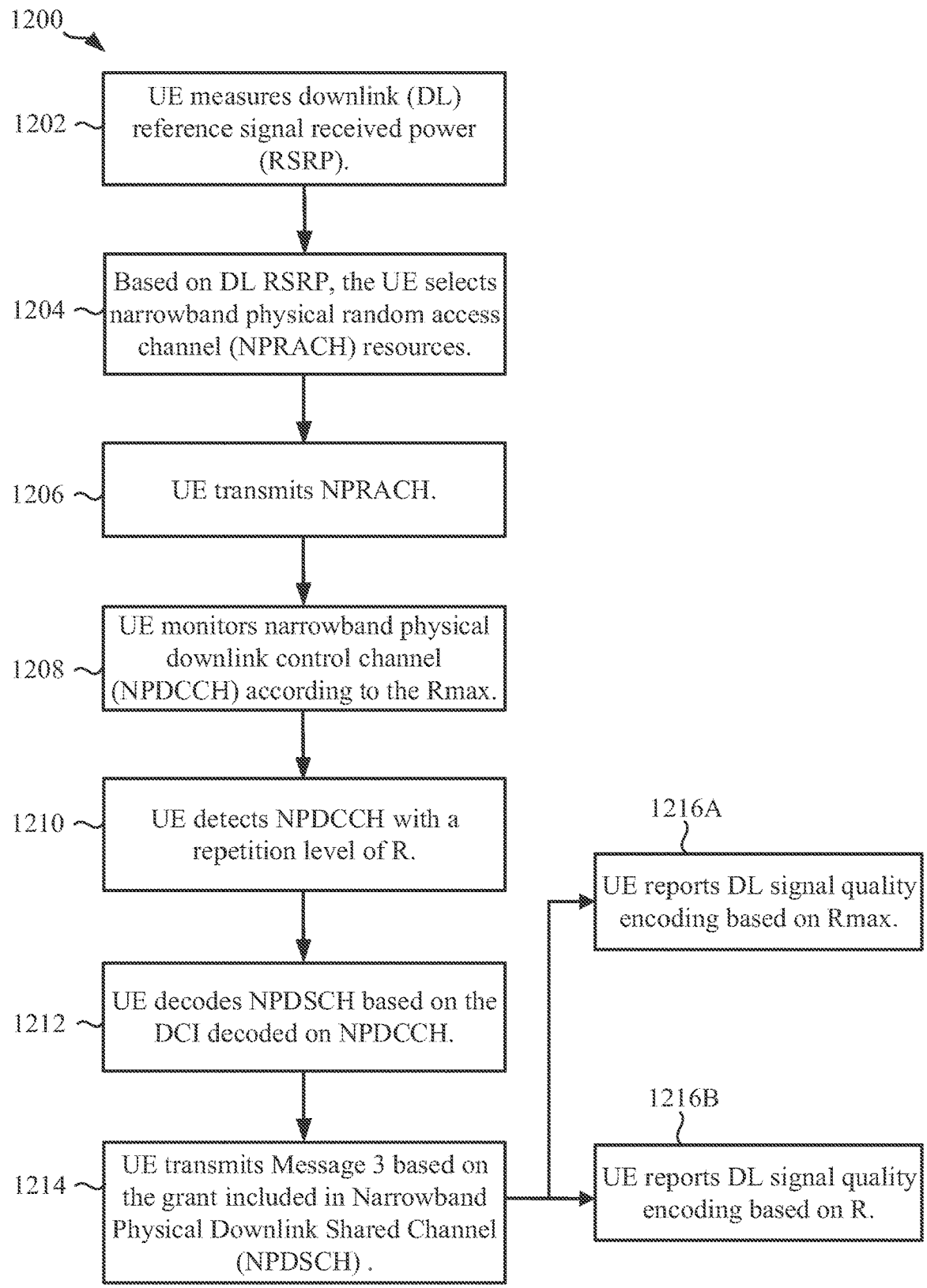
FIG. 12 illustrates a flowchart for a UE for transmitting a third message (Msg3) of a random access procedure during a random access procedure under an illustrative embodiment.

FIG. 12 illustrates a flowchart 1200 for a UE (e.g., UE 402) for transmitting Message 3 during a random access procedure using the techniques described herein under an illustrative embodiment. Starting with block 1202, the UE (e.g., UE 402) measures downlink RSRP, and, based on the measured RSRP, the UE may select NPRACH resources in block 1204. In block 1206, the UE transmits NPRACH to a node (e.g., node 404). The NPRACH resources of block 1204 may be based on RRC signaling, broadcast as a set of RSRP thresholds and NPRACH resources. The NPRACH resources may include the number of NPRACH repetitions and $R_{max}$ to monitor for NPDCCH for random access response.

In block 1208, the UE monitors NPDCCH according to the $R_{max}$. In block 1210, the UE detects NPDCCH with a repetition level of R, and the UE (e.g., 402) decodes NPDSCH based on the DCI decoded on NPDCCH in block 1212. In block 1214, the UE may then transmit Message 3 based on the grant included in NPDSCH. At this point, the UE has an option of reporting DL signal quality encoding, based on $R_{max}$ in block 1216A (e.g., <Rmax/2, between Rmax/2 and 2Rmax, >2Rmax), or reporting DL signal quality encoding based on R in block 1216B (e.g. <R/2, between R/2 and 2R, >2R).

Figure 13:
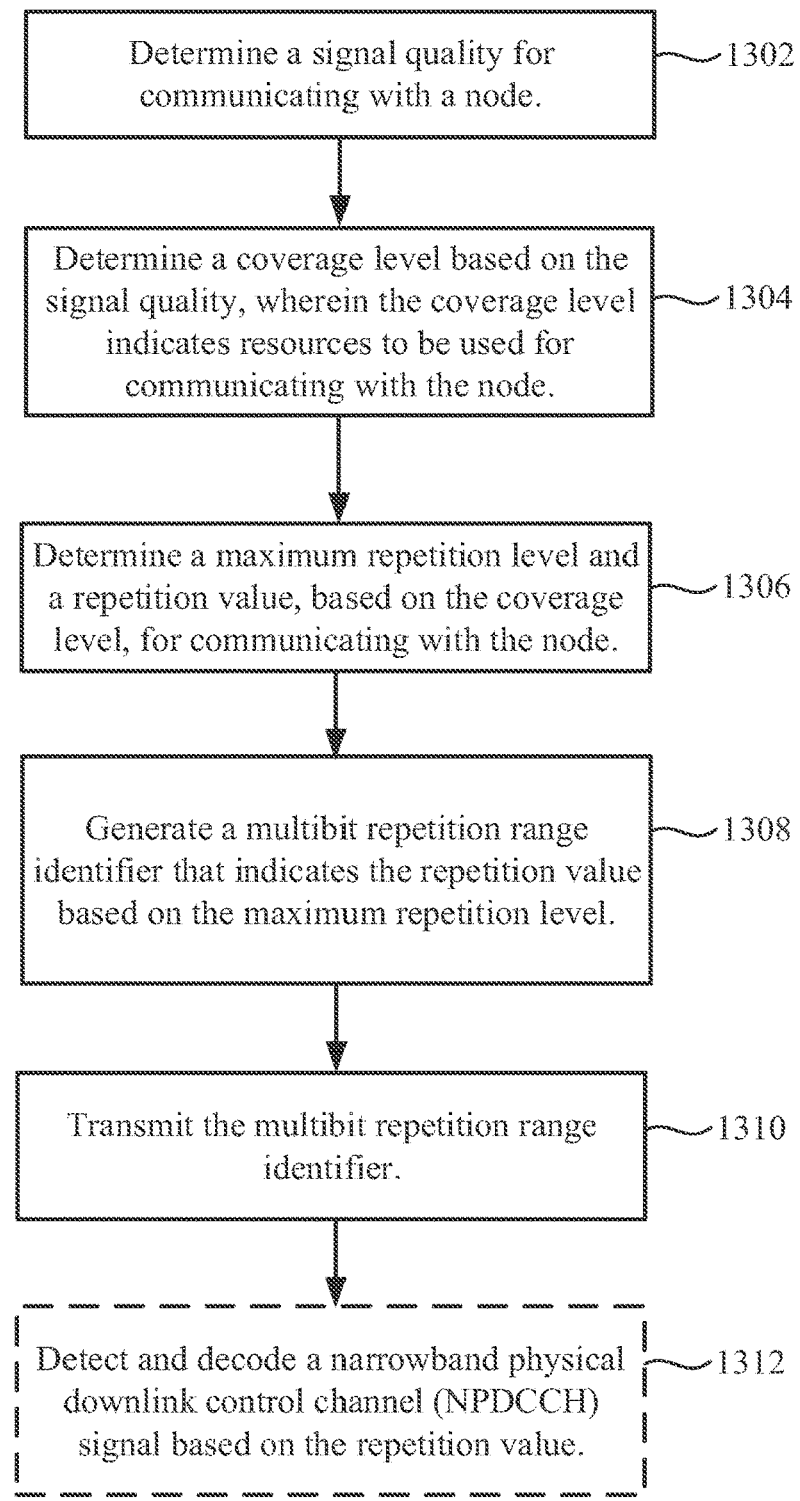
FIG. 13 shows a flow diagram for determining a coverage level for a maximum repetition level ($R_{max}$) to generate a multibit R' range identifier for determining the length of repetition candidates under an illustrative embodiment.

FIG. 13 shows a flow diagram 1300 for determining a coverage level for a maximum repetition level ($R_{max}$) to generate a multibit (R') range identifier for determining the length of repetition candidates under an illustrative embodiment. The operations (e.g., blocks 1302 through 1312) in the flow diagram 1300 may be performed by a UE (e.g., UE 402, apparatus 1400). The blocks represented with dashed lines in FIG. 13 represent optional blocks.

In block 1302, the UE may determine a signal quality for communicating with a node. In some aspects, the UE may determine the signal quality by measuring a downlink narrowband reference signal received power (NRSRP). At block 1304, the UE may determine a coverage level based on the signal quality, wherein the coverage level indicates resources to be used for communicating with the node. In some aspects, the UE may determine the coverage level by comparing the measured NRSRP to one or more thresholds, where each threshold corresponds to a different coverage level.

At block 1306, the UE may determine a maximum repetition level, based on the coverage level, for communicating with the node. For example, the maximum repetition level may be $R_{max}$ as described herein. In some aspects, the maximum repetition level is based on a number of repetitions needed to decode a Narrowband Physical Downlink Control Channel (NPDCCH).

At block 1308, the UE may generate a multibit repetition range identifier that corresponds to a repetition value, wherein the repetition value is based on the maximum repetition level. In some aspects, the multibit repetition range identifier comprises one of a plurality of bit combinations (e.g., '01', '10', '11') and the repetition value indicates a number of repetitions for decoding a Narrowband Physical Downlink Control Channel (NPDCCH) signal with a predetermined BLER. For example, the plurality of bit combinations may include at least a first bit combination mapped to a first value, a second bit combination mapped to a second value, and a third bit combination mapped to a third value, wherein the first value is half of the maximum repetition level, the second value is twice the maximum repetition level, and the third value is between half of the maximum repetition level and twice the maximum repetition level.

At block 1310, the UE may transmit the multibit repetition range identifier. At block 1312, the UE may detect and decode a Narrowband Physical Downlink Control Channel (NPDCCH) signal based on the repetition value.

Exemplary Apparatus (e.g., UE)

Figure 14:
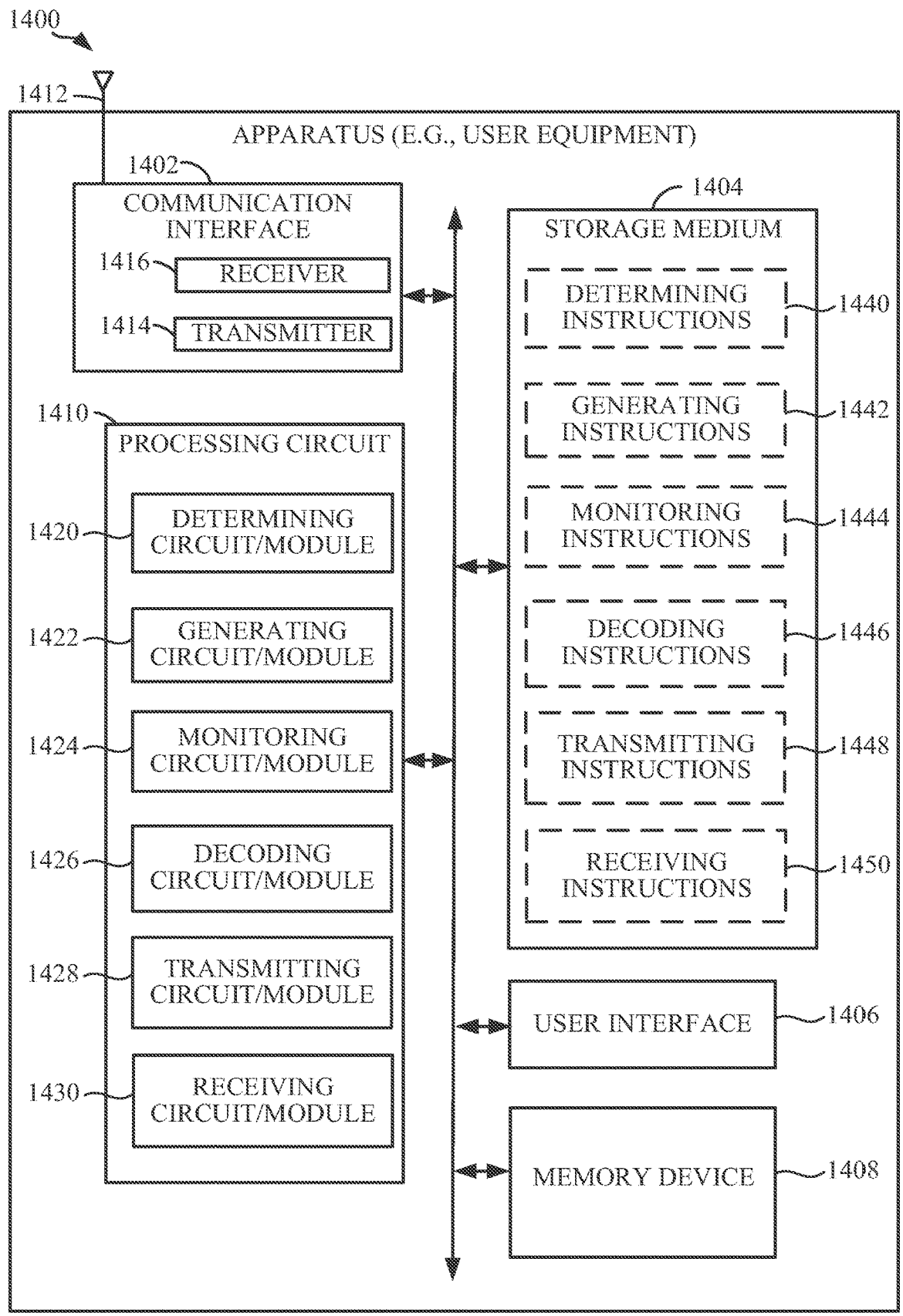
FIG. 14 is an illustration of an apparatus under an illustrative embodiment.

FIG. 14 is an illustration of an apparatus 1400 in accordance with one or more aspects of the disclosure. The apparatus 1400 includes a communication interface (e.g., at least one transceiver) 1402, a storage medium 1404, a user interface 1406, a memory device 1408, and a processing circuit 1410.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 may be adapted to facilitate wireless communication of the apparatus 1400. For example, the communication interface 1402 may include circuitry and/or code (e.g., instructions) adapted to facilitate the communication of information bi-directionally with respect to one or more communication devices in a network. The communication interface 1402 may be coupled to one or more antennas 1412 for wireless communication within a wireless communication system. The communication interface 1402 can be configured with one or more standalone receivers and/or transmitters, as well as one or more transceivers. In the illustrated example, the communication interface 1402 includes a transmitter 1414 and a receiver 1416.

The memory device 1408 may represent one or more memory devices. As indicated, the memory device 1408 may maintain network-related information/along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing code, such as processor executable code or instructions (e.g., software, firmware), electronic data, databases, or other digital information. The storage medium 1404 may also be used for storing data that is manipulated by the processing circuit 1410 when executing code. The storage medium 1404 may be any available media that can be accessed by a general purpose or special purpose processor, including portable or fixed storage devices, optical storage devices, and various other mediums capable of storing, containing or carrying code.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1700, distributed across multiple entities, etc.).

Code and/or instructions stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such code/instructions stored on the storage medium 1404. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired code provided by appropriate media in at least one example. For example, the processing circuit 1410 may be implemented as one or more processors, one or more controllers, and/or other structure configured to execute executable code. Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. As used herein, the term "adapted" in relation to the processing circuit 1410 may refer to the processing circuit 1410 being one or more of configured, employed, implemented, and/or programmed to perform a particular process, function, operation and/or routine according to various features described herein.

According to at least one example of the apparatus 1400, the processing circuit 1410 may include one or more of a determining circuit/module 1420, a generating circuit/module 1422, a monitoring circuit/module 1424, a decoding circuit/module 1426, a transmitting circuit module 1428, and a receiving circuit/module 1430 that are adapted to perform any or all of the features, processes, functions, operations and/or routines described herein (e.g., features, processes, functions, operations and/or routines described with respect to FIGS. 7, 9, 10, 12, and/or 13).

The determining circuit/module 1420 may include circuitry and/or instructions (e.g., determining instructions 1440 stored on the storage medium 1404) adapted to perform several functions relating to, for example, determining a signal quality for communicating with a node, determining a coverage level based on the signal quality, wherein the coverage level indicates resources to be used for communicating with the node, determining a coverage level for indicating resources to be used for communicating with the node, determining a maximum repetition level and a repetition value, based on the coverage level, for communicating with the node, determining if the one or more lower-level maximum repetition levels are suitable for use for the determined coverage level, using the lowest of the lower-level maximum repetition levels as a new maximum repetition level, determining a repetition value needed to decode a Narrowband Physical Downlink Control Channel (NPDCCH) signal with a predetermined minimum block error rate (BLER), determining narrowband physical random access (NPRACH) resources based on the measured NRSRP, and/or measuring downlink narrowband reference signal received power (NRSRP).

The generating circuit/module 1422 may include circuitry and/or instructions (e.g., generating instructions 1442 stored on the storage medium 1404) adapted to perform several functions relating to, for example, generating a multibit repetition range identifier that indicates the repetition value based on the maximum repetition level, and/or generating a multibit repetition range identifier based on the maximum repetition level, wherein the multibit repetition range identifier is configured to allow the device to receive a repetition value for repeating one or more signals received during a random access procedure.

The monitoring circuit/module 1424 may include circuitry and/or instructions (e.g., monitoring instructions 1444 stored on the storage medium 1404) adapted to perform several functions relating to, for example, monitoring one or more lower-level maximum repetition levels after determining the maximum repetition level, and monitoring a Narrowband Physical Downlink Control Channel (NPDCCH) based on the maximum repetition value.

The decoding circuit/module 1426 may include circuitry and/or instructions (e.g., decoding instructions 1446 stored on the storage medium 1404) adapted to perform several functions relating to, for example, decoding the NPDCCH signal using the repetition value to establish communications with the node, and/or detecting and decoding a NPDCCH signal based on the repetition value.

The transmitting circuit/module 1428 may include circuitry and/or instructions (e.g., transmitting instructions 1448 stored on the storage medium 1404) adapted to perform several functions relating to, for example, transmitting a multibit repetition range identifier, transmitting the repetition value to the node, transmitting a message (Msg3) from the device for initiating completion of a random access procedure, transmitting downlink signal quality data based on the maximum repetition level, and/or transmitting downlink signal quality data based on the repetition value.

The receiving circuit/module 1430 may include circuitry and/or instructions (e.g., receiving instructions 1450 stored on the storage medium 1404) adapted to perform several functions relating to, for example, receiving a maximum repetition level ($R_{max}$) comprising at least one repetition value.

As mentioned above, instructions stored by the storage medium 1404, when executed by the processing circuit 1410, causes the processing circuit 1410 to perform one or more of the various functions and/or process operations described herein. For example, the storage medium 1404 may include one or more of the determining instructions 1440, generating instructions 1442, monitoring instructions 1444, decoding instructions 1446, transmitting instructions 1448, receiving instructions 1450.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of wireless communication at a user equipment (UE), the method comprising:
   determining, by the UE, a signal quality for communicating with a node;
   determining, by the UE, a coverage level based on the signal quality, wherein the coverage level indicates resources to be used for communicating with the node;
   determining, by the UE, a maximum repetition level and a repetition value, based on the coverage level, for communicating with the node;
   generating, by the UE, a multibit repetition range identifier that indicates the repetition value based on the maximum repetition level, wherein the multibit repetition range identifier comprises one of a plurality of bit combinations, wherein the plurality of bit combinations comprises at least a first bit combination mapped to a first positive value, a second bit combination mapped to a second positive value, and a third bit combination mapped to a third positive value, wherein the first positive value is half of the maximum repetition level, the second positive value is twice the maximum repetition level, and the third positive value is between half of the maximum repetition level and twice the maximum repetition level; and
   transmitting, by the UE, the multibit repetition range identifier.

2. The method of claim 1, wherein the repetition value is based on a number of repetitions needed to decode a Narrowband Physical Downlink Control Channel (NPDCCH) signal with a predetermined minimum block error rate (BLER).

3. The method of claim 2, wherein the predetermined BLER is less than, or equal to, 1%.

4. The method of claim 1, wherein determining, by the UE, the signal quality comprises measuring, by the UE, a downlink narrowband reference signal received power (NRSRP).

5. The method of claim 4, wherein determining, by the UE, the coverage level comprises:
   comparing, by the UE, the measured NRSRP to one or more thresholds, wherein each threshold of the one or more thresholds corresponds to a different coverage level.

6. The method of claim 1, wherein determining the repetition value comprises generating a virtual Narrowband Physical Downlink Control Channel (NPDCCH) signal that is based on one or more predetermined parameters.

7. The method of claim 6, wherein the one or more predetermined parameters comprise at least one of:
   a search space in which a random access response is received,
   a Narrowband Physical Downlink Control Channel (NPDCCH) in which downlink control information (DCI) scheduling for a random access request is received,
   a Narrowband Physical Downlink Shared Channel (NPDSCH) carrying a random access response message,
   a subframe for a first narrowband physical uplink shared channel (NPUSCH) subframe carrying a connection request message,
   a start of a random access request (RAR) window, or
   after a transmission of a connection request message.

8. The method of claim 1, wherein determining the maximum repetition level comprises receiving the maximum repetition level from the node.

9. The method of claim 1, further comprising detecting and decoding a Narrowband Physical Downlink Control Channel (NPDCCH) signal based on the repetition value.

10. The method of claim 1, wherein the repetition value indicates a number of repetitions for decoding a Narrowband Physical Downlink Control Channel (NPDCCH) signal.

11. An apparatus for communication, comprising:
    one or more antennas, a processing apparatus, operatively coupled to the one or more antennas, the processing apparatus being configured to:
  determine a signal quality for communicating with a node;
  determine a coverage level based on the signal quality, wherein the coverage level indicates resources to be used for communicating with the node;
  determine a maximum repetition level and a repetition value, based on the coverage level, for communicating with the node;
  generate a multibit repetition range identifier that indicates the repetition value based on the maximum repetition level, wherein the multibit repetition range identifier comprises one of a plurality of bit combinations, wherein the plurality of bit combinations comprises at least a first bit combination mapped to a first positive value, a second bit combination mapped to a second positive value, and a third bit combination mapped to a third positive value, wherein the first positive value is half of the maximum repetition level, the second positive value is twice the maximum repetition level, and the third positive value is between half of the maximum repetition level and twice the maximum repetition level; and
  transmit the multibit repetition range identifier.

12. The apparatus of claim 11, wherein the repetition value is based on a number of repetitions needed to decode a Narrowband Physical Downlink Control Channel (NPDCCH) signal with a predetermined minimum block error rate (BLER).

13. The apparatus of claim 12, wherein the predetermined BLER is less than, or equal to, 1%.

14. The apparatus of claim 11, wherein the processing apparatus configured to determine the signal quality is further configured to measure a downlink narrowband reference signal received power (NRSRP).

15. The apparatus of claim 14, wherein the processing apparatus configured to determine the coverage level is further configured to compare the measured NRSRP to one or more thresholds, each threshold corresponding to a different coverage level.

16. The apparatus of claim 11, wherein the processing apparatus configured to determine the maximum repetition level and the repetition value is further configured to generate a virtual Narrowband Physical Downlink Control Channel (NPDCCH) signal that is based on one or more predetermined parameters.

17. The apparatus of claim 16, wherein the one or more predetermined parameters comprise at least one of:
  a search space in which a random access response is received,
  a Narrowband Physical Downlink Control Channel (NPDCCH) in which downlink control information (DCI) scheduling for a random access request is received,
  a Narrowband Physical Downlink Shared Channel (NPDSCH) carrying a random access response message,
  a subframe for a first narrowband physical uplink shared channel (NPUSCH) subframe carrying a connection request message,
  a start of a random access request (RAR) window, or
  after a transmission of a connection request message.

18. The apparatus of claim 11, wherein the processing apparatus configured to determine the maximum repetition level and the repetition value is further configured to receive the maximum repetition level from the node.

19. The apparatus of claim 11, wherein the processing apparatus is further configured to detect and decode a Narrowband Physical Downlink Control Channel (NPDCCH) signal based on the repetition value.

20. The apparatus of claim 11, wherein the repetition value indicates a number of repetitions for decoding a Narrowband Physical Downlink Control Channel (NPDCCH) signal.

21. An apparatus comprising:
  means for determining a signal quality for communicating with a node;
  means for determining a coverage level based on the signal quality, wherein the coverage level indicates resources to be used for communicating with the node;
  means for determining a maximum repetition level and a repetition value, based on the coverage level, for communicating with the node;
  means for generating a multibit repetition range identifier that indicates the repetition value based on the maximum repetition level, wherein the multibit repetition range identifier comprises one of a plurality of bit combinations, wherein the plurality of bit combinations comprises at least a first bit combination mapped to a first positive value, a second bit combination mapped to a second positive value, and a third bit combination mapped to a third positive value, wherein the first positive value is half of the maximum repetition level, the second positive value is twice the maximum repetition level, and the third positive value is between half of the maximum repetition level and twice the maximum repetition level; and
  means for transmitting the multibit repetition range identifier.

22. The apparatus of claim 21, wherein the maximum repetition level is based on a number of repetitions needed to decode a Narrowband Physical Downlink Control Channel (NPDCCH) signal with a predetermined minimum block error rate (BLER).

23. The apparatus of claim 22, wherein the predetermined BLER is less than, or equal to, 1%.

24. The apparatus of claim 21, further comprising means for detecting and decoding a Narrowband Physical Downlink Control Channel (NPDCCH) signal based on the repetition value.

25. The apparatus of claim 21, wherein the repetition value indicates a number of repetitions for decoding a Narrowband Physical Downlink Control Channel (NPDCCH) signal.

26. A non-transitory computer-readable medium storing computer-executable code, comprising code for causing a computer to:
  determine a signal quality for communicating with a node;
  determine a coverage level based on the signal quality, wherein the coverage level indicates resources to be used for communicating with the node;
  determine a maximum repetition level and a repetition value, based on the coverage level, for communicating with the node;
  generate a multibit repetition range identifier that indicates the repetition value based on the maximum repetition level, wherein the multibit repetition range identifier comprises one of a plurality of bit combinations, wherein the plurality of bit combinations comprises at least a first bit combination mapped to a first positive value, a second bit combination mapped to a second positive value, and a third bit combination mapped to a third positive value, wherein the first positive value is half of the maximum repetition level, the second positive value is twice the maximum repetition level, and the third positive value is between half of the maximum repetition level and twice the maximum repetition level; and transmit the multibit repetition range identifier.

27. The non-transitory computer-readable medium of claim 26, wherein the code further causes the computer to detect and decode a Narrowband Physical Downlink Control Channel (NPDCCH) signal based on the repetition value.

28. The method of claim 1, wherein the multibit repetition range identifier is generated based on a scaling value and the maximum repetition level.

29. The apparatus of claim 11, wherein the multibit repetition range identifier is generated based on a scaling value and the maximum repetition level.

30. The apparatus of claim 21, wherein the multibit repetition range identifier is generated based on a scaling value and the maximum repetition level.

* * * * *